(12) United States Patent
Mink et al.

(10) Patent No.: US 12,705,428 B2
(45) Date of Patent: Aug. 11, 2026

(54) SYSTEM AND METHOD OF SEMANTIC INTENT VALUE DISAMBIGUATION FOR ARTIFICIAL INTELLIGENCE PRODUCTIVITY TOOL-ENABLABLE APPLICATIONS ON AN INFORMATION HANDLING SYSTEM

(71) Applicant: Dell Products LP, Round Rock, TX (US)

(72) Inventors: Jacob Mink, Cedar Park, TX (US); Ashutosh Singh, Austin, TX (US); Mona Sachdev, Round Rock, TX (US)

(73) Assignee: DELL PRODUCTS LP, Round Rock, TX (US)

(*) Notice: Subject to any disclaimer, the term of this patent is extended or adjusted under 35 U.S.C. 154(b) by 229 days.

(21) Appl. No.: 18/758,895

(22) Filed: Jun. 28, 2024

(65) Prior Publication Data

US 2026/0004079 A1 Jan. 1, 2026

(51) Int. Cl.

| | |
|---|---|
| ***G06F 40/30*** | (2020.01) |
| ***G06F 8/61*** | (2018.01) |
| ***G06F 8/65*** | (2018.01) |

(52) U.S. Cl.

CPC ................ *G06F 40/30* (2020.01); *G06F 8/62* (2013.01); *G06F 8/65* (2013.01)

(58) Field of Classification Search

CPC ............... G06F 40/30; G06F 8/62; G06F 8/65

See application file for complete search history.

(56) References Cited

U.S. PATENT DOCUMENTS

| | | | | |
|---|---|---|---|---|
| 5,473,691 A * | 12/1995 | Menezes | ............ | H04N 1/32128 380/243 |
| 10,558,753 B2 * | 2/2020 | Deshpande | ............... | G06F 8/70 |
| 2011/0145920 A1 * | 6/2011 | Mahaffey | ............. | H04W 12/12 726/22 |
| 2012/0077505 A1 * | 3/2012 | Wietfeldt | ............. | H04W 72/02 455/450 |
| 2012/0077506 A1 * | 3/2012 | Wietfeldt | ............. | H04W 72/02 455/450 |

(Continued)

*Primary Examiner* — Athar N Pasha

(74) *Attorney, Agent, or Firm* — Prol Intellectual Property Law, PLLC; H. Kenneth Prol

(57) ABSTRACT

A system and method of a hardware processor executing code instructions for selecting between artificial intelligence (AI) productivity tool-enablable software applications during processing an AI productivity tool query of an AI productivity tool module includes gathering capabilities associated with each of a plurality of AI productivity tool-enablable software applications, generating capability intent values for association with natural language descriptions of the gathered capabilities associated with each of a plurality of AI productivity tool-enablable software applications, comparing the capability intent values associated with each of a plurality of AI productivity tool-enablable software applications for similarity, and determining among the gathered capabilities of each of the AI productivity tool-enablable software applications redundant or primary AI productivity tool-enablable software application capabilities based on a similarity threshold vector value for selection of capabilities to be used to respond to user query inputs to an AI productivity tool.

20 Claims, 7 Drawing Sheets

(56) References Cited

U.S. PATENT DOCUMENTS

2015/0186533 A1* 7/2015 Patil .................... G06F 16/9535 707/723
2017/0097936 A1* 4/2017 Glover ................ G06F 16/2425
2018/0314495 A1* 11/2018 Lee ........................... G06F 8/10
2020/0089761 A1* 3/2020 Guerra .................... G06F 40/30
2020/0387550 A1 12/2020 Cappetta
2020/0394360 A1 12/2020 Dunn
2021/0256207 A1 8/2021 Dunn
2021/0366506 A1 11/2021 Han
2021/0374353 A1 12/2021 Zhang
2022/0165006 A1* 5/2022 Loyola Heufemann ..................... G06F 16/5838
2022/0318502 A1 10/2022 Howell
2023/0105806 A1 4/2023 Dunn
2023/0222359 A1 7/2023 Panikkar
2023/0237263 A1 7/2023 Howell
2025/0068703 A1* 2/2025 Deshpande ........... G06F 21/602

* cited by examiner

Figure 3:
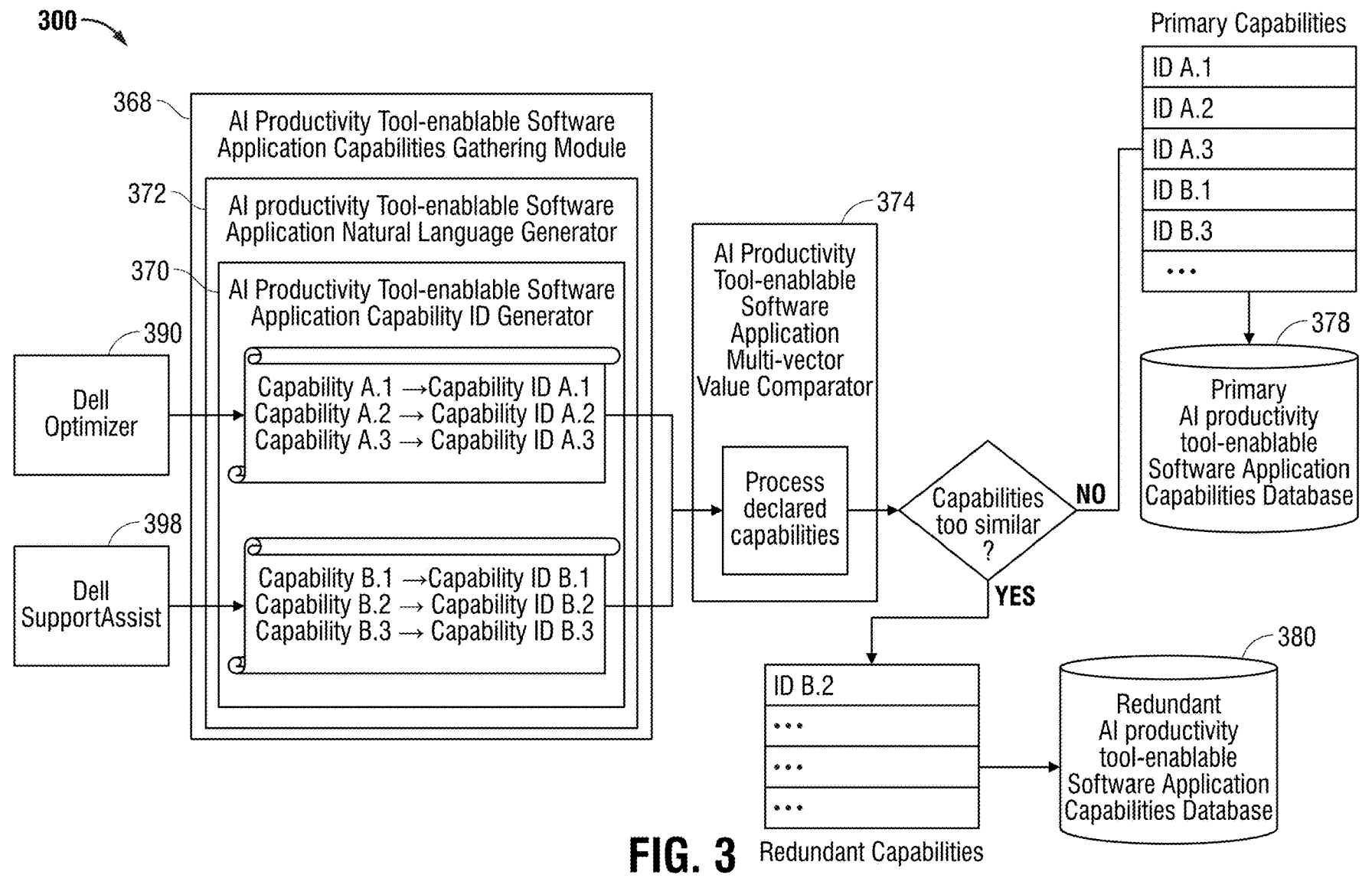

300

368 AI Productivity Tool-enablable Software Application Capabilities Gathering Module 372 AI productivity Tool-enablable Software Application Natural Language Generator 370 AI Productivity Tool-enablable Software Application Capability ID Generator Capability A.1 → Capability ID A.1
Capability A.2 → Capability ID A.2
Capability A.3 → Capability ID A.3

Capability B.1 → Capability ID B.1
Capability B.2 → Capability ID B.2
Capability B.3 → Capability ID B.3

390 Dell Optimizer

398 Dell SupportAssist

374 AI Productivity Tool-enablable Software Application Multi-vector Value Comparator Process declared capabilities Capabilities too similar ?

YES

NO

Primary Capabilities

ID A.1
ID A.2
ID A.3
ID B.1
ID B.3
...

378 Primary AI productivity tool-enablable Software Application Capabilities Database Redundant Capabilities

ID B.2
...
...
...

380 Redundant AI productivity tool-enablable Software Application Capabilities Database

Is the intent vector value of a capability associated with a more distinct intent value from other intent values or desired AI productivity tool-enablable application ? — 512

YES

NO

515 — Primary AI productivity tool-enablable Software Application Capabilities

B

516 — Label the capability as a redundant AI productivity tool-enablable application capability 514 — Label the capability as a primary AI productivity tool-enablable application capability 517 — Redundant AI productivity tool-enablable Application Capabilities Database 518 — Has an AI productivity tool-enablable application been updated or uninstalled ?

NO

YES

520 — Change a redundant AI productivity tool-enablable application capability to a primary AI productivity tool-enablable application capability

END

FIG. 5 (Continued)

SYSTEM AND METHOD OF SEMANTIC INTENT VALUE DISAMBIGUATION FOR ARTIFICIAL INTELLIGENCE PRODUCTIVITY TOOL-ENABLABLE APPLICATIONS ON AN INFORMATION HANDLING SYSTEM

FIELD OF THE DISCLOSURE

The present disclosure generally relates to artificial intelligence (AI) productivity tools. The present disclosure more specifically relates systems and methods of selecting between artificial intelligence (AI) productivity tool-enablable applications during an AI productivity tool query of an AI productivity tool module such as used with natural language systems.

BACKGROUND

As the value and use of information continues to increase, individuals and businesses seek additional ways to process and store information. One option available to clients is information handling systems. An information handling system generally processes, compiles, stores, and/or communicates information or data for business, personal, or other purposes thereby allowing clients to take advantage of the value of the information. Because technology and information handling may vary between different clients or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific client or specific use, such as e-commerce, financial transaction processing, airline reservations, enterprise data storage, or global communications. In addition, information handling systems may include a variety of hardware and software components that may be configured to process, store, and communicate information and may include one or more computer systems, data storage systems, and networking systems. The information handling system may include telecommunication, network communication, and video communication capabilities. The information handling system may be used to execute instructions of one or more software applications such as workspace productivity applications, or gaming applications or the like. Further, the information handling system may include AI productivity tools that interface with various AI productivity tool-enablable software applications such as natural language chat-enabled environments for interface with services of software applications that increase the efficiency of the operation of the information handling system.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which:

FIG. 3 is a flow diagram showing a method of gathering capabilities associated with each of a plurality of AI productivity tool-enablable software applications and executing an AI productivity tool-enablable software application multi-vector value comparator to compare the intent values for association with the natural language descriptions of each of the gathered capabilities associated with each of a plurality of AI productivity tool-enablable software applications to determine capability redundancy according to an embodiment of the present specification;

The use of the same reference symbols in different drawings may indicate similar or identical items.

DETAILED DESCRIPTION OF THE DRAWINGS

Figure 1:
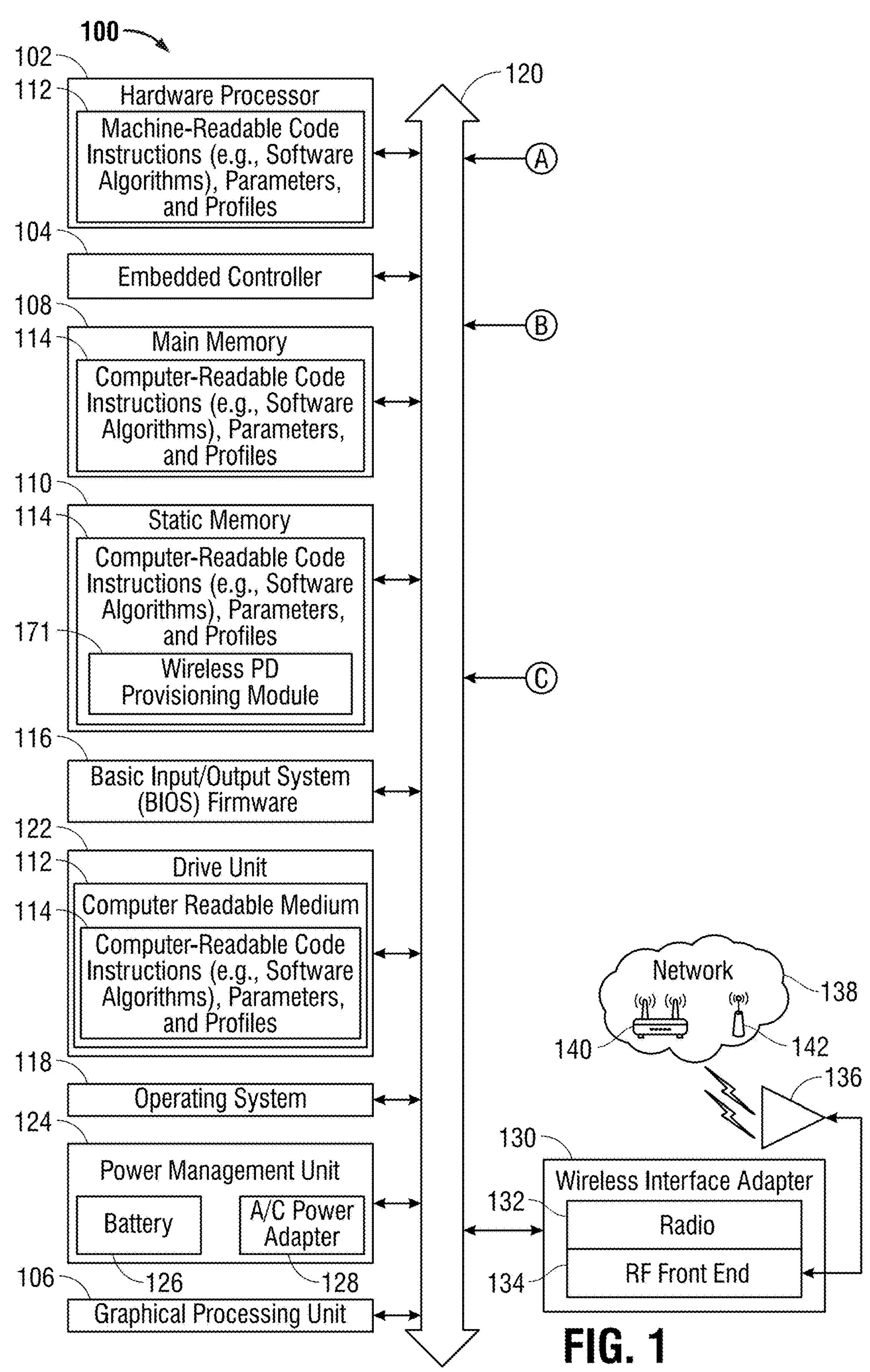
FIG. 1 is a block diagram illustrating an information handling system that includes an AI productivity tool and an AI productivity tool subagent to select among a plurality of AI productivity tool-enablable software applications for services, operations, or responses of those AI productivity tool-enablable software applications according to an embodiment of the present disclosure.
Figure 1:
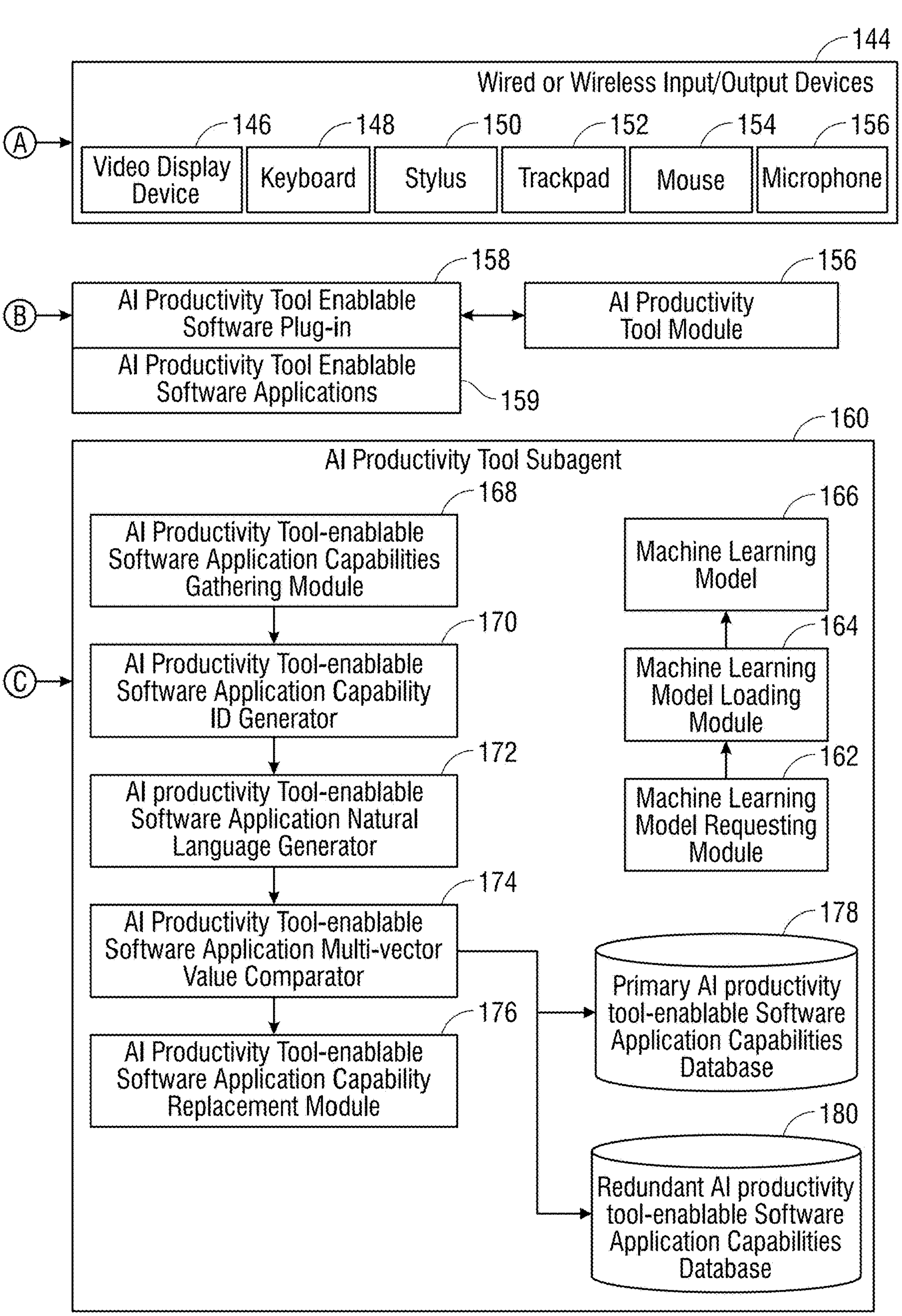

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Artificial intelligence (AI) is a developing technology that is used to increase efficiency of computing systems and humans alike. An example of AI technologies includes, but is not limited to, chat-enabled environments (voice, text, etc.). Often, these chat-enabled environments are described as AI productivity tool modules that receive this voice or text input from a user and implements a number of actions or utilize services of various software applications based on the natural language of the input. In some information handling systems, the AI productivity tool modules may interface with various AI productivity tool-enablable software applications being executed or executable on the information handling system. These AI productivity tool-enablable software applications may integrate with the AI productivity tool to allow user queries to trigger certain actions declared, supported, and managed by these AI productivity tool-enablable software applications. A plurality of these AI productivity tool-enablable software applications may be available using the AI productivity tool module such as chat-enabled environments, and a selection among many software application capabilities must be made for responsive capabilities when a user makes a query. In some cases, capabilities may overlap among the AI productivity tool-enablable software applications and collision of operations and services may result. Further, these AI productivity tool-enablable software applications may change or be updated over time and during use of the information handling system. This results in changes to the interfaces between the AI productivity tool and these AI productivity tool-enablable software application such as the removal of functionalities, new functionalities being created, and or different arguments between the AI productivity tool and AI productivity tool-enablable software applications. As the number of AI productivity tool-enablable software applications increases, the AI productivity tool must be scaled to support new functionalities without requiring constant updates to the AI productivity tool and/or the AI productivity tool-enablable software applications. Still further, different operating capabilities associated with each of the plurality of AI productivity tool-enablable software applications must be well defined and not overlap in functionality. Where, for example, a first AI productivity tool-enablable software application and a second AI productivity tool-enablable software application can be used to execute the same functionalities based on the user text or voice queries, a dynamic disambiguation process must be used to prevent collisions between these two AI productivity tool-enablable software applications.

The present specification describes a system and method of selecting between AI productivity tool-enablable software applications during an AI productivity tool query of an AI productivity tool module. The process includes gathering, either in real-time or prior to execution of the AI productivity tool, capabilities associated with each of a plurality of AI productivity tool-enablable software applications. These capabilities (also called intents and having intent values) may describe those functionalities of each of the AI productivity tool-enablable software applications that may be used when interfacing with the AI productivity tool. The capabilities or intents have capability intent values that are a mathematical representation of capability operations or services from various AI productivity tool-enablable software applications in embodiments herein. These capability intent values may be represented by a mathematical value in a multi-axis vector space that may be associated with a natural language description for that capability or intent. In an embodiment, the capabilities may be associated with an identification (ID) such as an alphanumeric ID.

In an embodiment, the method includes, initially, executing an AI productivity tool-enablable software application capabilities gathering module with a hardware processor to gather capabilities associated with each of a plurality of AI productivity tool-enablable software applications. The method further includes executing an AI productivity tool-enablable software application natural language generator with the hardware processor to determine intent values associated with generated natural language descriptions of the gathered capabilities associated with each of a plurality of AI productivity tool-enablable software applications. With the capability intent values associated with the natural language descriptions of the gathered capabilities, the method includes executing an AI productivity tool-enablable software application multi-vector value comparator to compare the capability intent values for association with the natural language descriptions of each of the gathered capabilities associated with each of a plurality of AI productivity tool-enablable software applications and selectively mark the gathered capabilities of each of the AI productivity tool-enablable software applications as primary AI productivity tool-enablable software application capabilities and redundant AI productivity tool-enablable software application capabilities.

In an embodiment, the method includes executing the AI productivity tool module with the hardware processor of the information handling system and prioritizing primary AI productivity tool-enablable software applications that include primary AI productivity tool-enablable software application capabilities to interface with the execution of the AI productivity tool module over AI productivity tool-enablable software applications that include redundant AI productivity tool-enablable software application capabilities.

Where changes are made to the AI productivity tool module and/or AI productivity tool-enablable software applications occurs, the hardware processor of the information handling system executes an AI productivity tool-enablable software application capability replacement module. Execution of the AI productivity tool-enablable software application capability replacement module determines when an AI productivity tool-enablable software application having primary AI productivity tool-enablable software application capabilities is uninstalled or updated and replace any missing primary AI productivity tool-enablable software application capabilities with one of the redundant AI productivity tool-enablable software application capabilities to replace the, now, missing primary AI productivity tool-enablable software application capabilities.

In an embodiment, during operation, the method includes executing a machine learning model requesting module by the hardware processor to interface with the AI productivity tool to determine which of the AI productivity tool-enablable software applications to execute. This also includes executing a machine learning module loading module with the hardware processor to select one or more machine learning models to determine which AI productivity tool-enablable software application to execute in response to a client query or other AI productivity tool module input.

Data related to the primary AI productivity tool-enablable software application capabilities and redundant AI productivity tool-enablable software application capabilities may be stored in databases for later user during the execution of the AI productivity tool module. This allows the AI productivity tool subagent 160 to select from both AI productivity tool-enablable software applications that includes primary AI productivity tool-enablable software application capabilities and AI productivity tool-enablable software applications that includes redundant AI productivity tool-enablable software application capabilities when changes to the AI productivity tool module and or the AI productivity tool-enablable software applications has occurred.

Turning now to the figures, FIG. 1 illustrates an information handling system 100 similar to the information handling systems according to several aspects of the present disclosure. In the embodiments described herein, an information handling system 100 includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system 100 may be a personal computer, mobile device (e.g., personal digital assistant (PDA) or smart phone), server (e.g., blade server or rack server), a consumer electronic device, a network server or storage device, a network router, switch, or bridge, wireless router, or other network communication device, a network connected device (cellular telephone, tablet device, etc.), IoT computing device, wearable computing device, a set-top box (STB), a mobile information handling system, a palmtop computer, a laptop computer, a desktop computer, a communications device, an access point (AP) 140, a base station transceiver 142, a wireless telephone, a control system, a camera, a scanner, a printer, a personal trusted device, a web appliance, or any other suitable machine capable of executing a set of instructions (sequential or otherwise) that specify actions to be taken by that machine, and may vary in size, shape, performance, price, and functionality.

In a networked deployment, the information handling system 100 may operate in the capacity of a client computer in a server-client network environment, or as a peer computer system in a peer-to-peer (or distributed) network environment. In an embodiment, the information handling system 100 may be implemented using electronic devices that provide voice, video, or data communication. For example, an information handling system 100 may be any mobile or other computing device capable of executing a set of instructions (sequential or otherwise) that specify actions to be taken by that machine. Further, while a single information handling system 100 is illustrated, the term "system" shall also be taken to include any collection of systems or sub-systems that individually or jointly execute a set, or plural sets, of instructions to perform one or more computer functions.

The information handling system 100 may include main memory 108, (volatile (e.g., random-access memory, etc.), or static memory 110, nonvolatile (read-only memory, flash memory etc.) or any combination thereof), one or more hardware processing resources, such as a hardware processor 102 that may be a central processing unit (CPU), embedded controller (EC) 104, a graphics processing unit (GPU) 106, or any combination thereof. Additional components of the information handling system 100 may include one or more storage devices such as static memory 110 or drive unit 122. The information handling system 100 may include or interface with one or more communications ports for communicating with external devices, as well as various input and output (I/O) devices 144, such as a mouse 154, a trackpad 152, a stylus 150, a keyboard 148, a video/graphics display device 146, or any combination thereof. Portions of an information handling system 100 may themselves be considered information handling systems 100.

Information handling system 100 may include devices or modules that embody one or more of the devices or execute instructions for one or more systems and modules. The information handling system 100 may execute instructions (e.g., software algorithms), parameters, and profiles 114 that may operate on servers or systems, remote data centers, or on-box in individual client information handling systems according to various embodiments herein. In some embodiments, it is understood any or all portions of instructions (e.g., software algorithms), parameters, and profiles 114 may operate on a plurality of information handling systems 100.

The information handling system 100 may include the hardware processor 102 such as a central processing unit (CPU) or other hardware processing resources. Any of the hardware processing resources may operate to execute code that is either firmware or software code. Moreover, the information handling system 100 may include memory such as main memory 108, static memory 110, and disk drive unit 122 (volatile (e.g., random-access memory, etc.), nonvolatile memory (read-only memory, flash memory etc.) or any combination thereof or other memory with computer readable medium 112 storing instructions (e.g., software algorithms), parameters, and profiles 114 executable by the hardware processor 102, EC 104, GPU 106, or any other hardware processing device. The information handling system 100 may also include one or more buses 120 operable to transmit communications between the various hardware components such as any combination of various I/O devices 144 as well as between hardware processors 102, an EC 104, the operating system (OS) 118, the basic input/output system (BIOS) 116, the wireless interface adapter 130, or a radio module, among other components described herein. In an embodiment, the hardware processor 102, EC 104, and/or GPU 106 may execute one or more bus drivers in order to transmit this data between the information handling system 100 and the input/output devices 144 described herein. In an embodiment, the information handling system 100 may be in wired or wireless communication with the I/O devices 144 such a keyboard 148, a mouse 154, video display device 146, stylus 150, trackpad 152, among other peripheral devices.

As described herein, the information handling system 100 further includes a video/graphics display device 146. The video/graphics display device 146 in an embodiment may function as a liquid crystal display (LCD), an organic light emitting diode (OLED), a flat panel display, or a solid-state display. It is appreciated that the video/graphics display device 146 may be wired or wireless and may be an external video/graphics display device 146 that allows a user to increase the desktop area by extending the desktop in an embodiment. Additionally, as described herein, the information handling system 100 may include or be operatively coupled to a cursor control device (e.g., a trackpad 152, or gesture or touch screen input), a stylus 150, and/or a keyboard 148, among others that allows the user to interface with the information handling system 100 via the video/graphics display device 146. Information handling system 100 may also be operatively coupled to a wired or wireless input/output device 144 or other hardware devices that may include a hardware processing device such as a hardware processor, microcontroller, or other hardware processing resource. Various drivers and hardware control device electronics may be operatively coupled to operate the I/O devices 144 according to the embodiments described herein. The present specification contemplates that the I/O devices 144 may be wired or wireless.

A network interface device of the information handling system 100 may be wired or wireless such as shown with wireless interface adapter 130 that can provide wireless connectivity among devices such as with Bluetooth® or to a network 138, e.g., a wide area network (WAN), a local area network (LAN), wireless local area network (WLAN), a wireless personal area network (WPAN), a wireless wide area network (WWAN), or other network. In embodiments described herein, the wireless interface adapter 130 with its radio 132, RF front end 134 and antenna 136 is used to communicate with the wireless peripheral devices, via, for example, a Bluetooth® or Bluetooth® Low Energy (BLE) protocols or any proprietary RF protocol such as those may utilize similar frequency ranges but proprietary modulation and data transmission characteristics. In embodiments, Bluetooth®, BLE, proprietary RF protocol, or other WPAN or WLAN protocols and plural such protocols may be used for communication with and among any wireless peripheral device to be paired or paired with the information handling system 100 or other information handling systems.

In other embodiments, a WAN, WWAN, LAN, and WLAN may each include an AP 140 or base station 142 used to operatively couple the information handling system 100 to a network 138 via a wireless interface adapter 130. In a specific embodiment, the network 138 may include macro-cellular connections via one or more base stations 142 or a wireless AP 140 (e.g., Wi-Fi), or such as through licensed or unlicensed WWAN small cell base stations 142. Connectivity may be via wired or wireless connection. For example, wireless network wireless APs 140 or base stations 142 may be operatively connected to the information handling system 100. Wireless interface adapter 130 may include one or more RF (RF) subsystems (e.g., radio 132) with transmitter/receiver circuitry, modem circuitry, one or more antenna RF (RF) front end circuits 134, one or more wireless controller circuits, amplifiers, antennas 136 and other circuitry of the radio 132 such as one or more antenna ports used for wireless communications via multiple radio access technologies (RATs). The radio 132 may communicate with one or more wireless technology protocols.

In an embodiment, the wireless interface adapter 130 may operate in accordance with any wireless data communication standards. To communicate with a wireless local area network, standards including IEEE 802.11 WLAN standards (e.g., IEEE 802.11ax-2021 (Wi-Fi 6E, 6 GHZ)), IEEE 802.15 WPAN standards, WWAN such as 3GPP or 3GPP2, Bluetooth® standards, proprietary RF protocol, or similar wireless standards may be used. Wireless interface adapter 130 may connect to any combination of macro-cellular wireless connections including 2G, 2.5G, 3G, 4G, 5G or the like from one or more service providers. Utilization of RF communication bands according to several example embodiments of the present disclosure may include bands used with the WLAN standards and WWAN carriers which may operate in both licensed and unlicensed spectrums. The wireless interface adapter 130 can represent an add-in card, wireless network interface module that is integrated with a main board of the information handling system 100 or integrated with another wireless network interface capability, or any combination thereof.

In some embodiments, software, firmware, dedicated hardware implementations such as application specific integrated circuits, programmable logic arrays and other hardware devices may be constructed to implement one or more of some systems and methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a hardware controller or a hardware processor system. Further, in an exemplary, non-limited embodiment, implementations may include distributed hardware processing, component/object distributed hardware processing, and parallel hardware processing. Alternatively, virtual computer system processing may be constructed to implement one or more of the methods or functionalities as described herein.

The present disclosure contemplates a computer-readable medium that includes computer-readable code instructions, parameters, and profiles 114 or receives and executes instructions, parameters, and profiles 114 responsive to a propagated signal, so that a hardware device connected to a network 138 may communicate voice, video, or data over the network 138. Further, the instructions 114 may be transmitted or received over the network 138 via the network interface device or wireless interface adapter 130.

The information handling system 100 may include a set of instructions 114 that may be executed to cause the computer system to perform any one or more of the methods or computer-based functions disclosed herein. For example, instructions 114 may be executed by a hardware processor 102, GPU 106, EC 104 or any other hardware processing resource and may include software agents, or other aspects or components used to execute the methods and systems described herein. Various software modules comprising application instructions 114 may be coordinated by an OS 118, and/or via an application programming interface (API) include a unified device API described herein. An example OS 118 may include Windows®, Android®, and other OS types. Example APIs may include Win 32, Core Java API, or Android APIs.

In an embodiment, the information handling system 100 may include a disk drive unit 122. The disk drive unit 122 and may include machine-readable code instructions, parameters, and profiles 114 in which one or more sets of machine-readable code instructions, parameters, and profiles 114 such as firmware or software can be embedded to be executed by the hardware processor 102 or other hardware processing devices such as a GPU 106 or EC 104, or other microcontroller unit to perform the processes described herein. Similarly, main memory 108 and static memory 110 may also contain a computer-readable medium for storage of one or more sets of machine-readable code instructions, parameters, or profiles 114 described herein. The disk drive unit 122 or static memory 110 also contain space for data storage. Further, the machine-readable code instructions, parameters, and profiles 114 may embody one or more of the methods as described herein. In a particular embodiment, the machine-readable code instructions, parameters, and profiles 114 may reside completely, or at least partially, within the main memory 108, the static memory 110, and/or within the disk drive 122 during execution by the hardware processor 102, EC 104, or GPU 106 of information handling system 100.

Main memory 108 or other memory of the embodiments described herein may contain computer-readable medium (not shown), such as RAM in an example embodiment. An example of main memory 108 includes random access memory (RAM) such as static RAM (SRAM), dynamic RAM (DRAM), non-volatile RAM (NV-RAM), or the like, read only memory (ROM), another type of memory, or a combination thereof. Static memory 110 may contain computer-readable medium (not shown), such as NOR or NAND flash memory in some example embodiments. The applications and associated APIs, for example, may be stored in static memory 110 or on the disk drive unit 122 that may include access to a machine-readable code instructions, parameters, and profiles 114 such as a magnetic disk or flash memory in an example embodiment. While the computer-readable medium is shown to be a single medium, the term "computer-readable medium" includes a single medium or multiple media, such as a centralized or distributed database, and/or associated caches and servers that store one or more sets of machine-readable code instructions. The term "computer-readable medium" shall also include any medium that is capable of storing, encoding, or carrying a set of machine-readable code instructions for execution by a processor or that cause a computer system to perform any one or more of the methods or operations disclosed herein.

In an embodiment, the information handling system 100 may further include a power management unit (PMU) 124 (a.k.a. a power supply unit (PSU)). The PMU 124 may include a hardware controller and executable machine-readable code instructions to manage the power provided to the components of the information handling system 100 such as the hardware processor 102 and other hardware components described herein. The PMU 124 may control power to one or more components including the one or more drive units 122, the hardware processor 102 (e.g., CPU), the EC 104, the GPU 106, a video/graphic display device 146, or other wired I/O devices 144 such as the mouse 154, the stylus 150, the keyboard 148, and the trackpad 152 and other components that may require power when a power button has been actuated by a user. In an embodiment, the PMU 124 may monitor power levels and be electrically coupled to the information handling system 100 to provide this power. The PMU 124 may be coupled to the bus 120 to provide or receive data or machine-readable code instructions. The PMU 124 may regulate power from a power source such as the battery 126 or AC power adapter 128. In an embodiment, the battery 126 may be charged via the AC power adapter 128 and provide power to the components of the information handling system 100, via wired connections as applicable, or when AC power from the AC power adapter 128 is removed.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium 110 can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or machine-readable code instructions may be stored.

In other embodiments, dedicated hardware implementations such as application specific integrated circuits (ASICs), programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses hardware resources executing software or firmware, as well as hardware implementations.

As described in embodiments herein, the information handling system 100 includes an AI productivity tool module 156. The AI productivity tool module 156 may include any artificial intelligence-based productivity tool. The AI productivity tool module 156 may include chatbot features, virtual assistant features, natural language systems, and other artificial intelligence features that allow a user to provide input to the information handling system 100 and, with generative artificial intelligence processing for conducting operations or services on the information handling system 100 from any of a selection of AI productivity tool-enablable software applications 159 responsive to those query inputs. The AI productivity tool-enablable software applications 159 may interface with the AI productivity tool module 156 via the AI productivity tool-enablable software plugins 158. The AI productivity tool module 156 may be a proprietary AI productivity tool or may a be third party AI productivity tool that interfaces with or engages with a proprietary AI productivity tool at the information handling system 100. Examples of some third-party AI productivity tool modules 156 may include chatbot or AI query input and assistance systems such as Cortana® by Microsoft®, Copilot® by Microsoft®, Siri® by Apple® Inc., Gemini® by Google AI®, ChatGPT® by OpenAI®, and Amazon Alexa® by Amazon®, among others. It is appreciated that the information handling system 100 may include any proprietary AI productivity tool module 156 used to interface with the information handling system 100 and the operations thereon such that a user may provide input to the information handling system 100 and, with generative artificial intelligence processing, conduct operations or services on the information handling system 100 from any of a selection of AI productivity tool-enablable software applications 159 responsive to those query inputs.

The AI productivity tool module 156 may interface with the information handling system 100 (e.g., via the bus 120) via an AI productivity tool enablable software plug-ins 158. The AI productivity tool enablable software applications 159 may be any software or firmware that allows the AI productivity tool module 156 to perform those actions at the information handling system 100 based on input (e.g., typed or spoken words) from the user. The AI productivity tool enablable software plug-ins 158 may be used by the AI productivity tool module 156 to interface with any number of AI productivity tool-enablable software applications 159 and their capabilities executing or executable on the information handling system 100 as described herein.

The information handling system 100 also includes an AI productivity tool subagent 160. The AI productivity tool subagent 160 may be any software and/or firmware executable by the hardware processor 102 of the information handling system 100 to interface one or more of a plurality of the AI productivity tool-enablable software applications 159 and AI productivity tool enablable software plug-ins 158 to provide AI enabled features, referred to as capabilities, within those AI productivity tool-enablable software applications 159 to enable operations, software services, or responses. In an embodiment, the AI productivity tool subagent 160 includes computer-readable program code instructions that may communicate with other subagents, modules, software applications and software systems executed at the information handling system 100 securely over a remote process communication (RPC) protocol. In an embodiment, the AI productivity tool subagent 160 may be used to direct the execution of various modules described herein.

In an embodiment, the AI productivity tool subagent 160 may include a machine learning model requesting module 162. The machine learning model requesting module 162 may be used by the AI productivity tool subagent 160 too, when prompted via the AI productivity tool enablable software plug-ins 158 to request a specific machine learning model 166. During operation for example, the machine learning model requesting module 162 may request that one or more machine learning models 166 be loaded by the machine learning model loading module 164 such that, for example, the text or voice input from the user may be processed through a speech recognition models and/or processed through any of a plurality of natural language models or other ML models in order to determine an intent of the user's input. It is appreciated that these machine learning models 166 may include one or more models that work together to both decipher the user's intent while also conducting operations at the information handling system 100 to provide feedback to the user such as creating AI generated text at a word processing application or voice generation software being executed by the hardware processor 102 on the information handling system 100, for example.

In an embodiment, the AI productivity tool subagent 160 also includes an AI productivity tool-enablable software application capabilities gathering module 168. The AI productivity tool-enablable software application capabilities gathering module 168 may be executed by the hardware processor 102, the EC 104, the GUI 106 or any other hardware processing device. The AI productivity tool-enablable software application capabilities gathering module 168 may gather capabilities associated with each of a plurality of AI productivity tool-enablable software applications 159. These capabilities gathered by the AI productivity tool-enablable software application capabilities gathering module 168 may include any input and output capabilities provided by the AI productivity tool-enablable software applications 159 being executed by the hardware processor 102 or any other processing devices. For example, an AI productivity tool-enablable software application 159 may include a word processing application such as Microsoft® Word® that may receive input (e.g., via voice at a microphone 182 or text via a keyboard 148) and provide output via text. Still further, other examples of an AI productivity tool-enablable software application 159 may include an updating software, virus protection software, and setting optimization software such as Dell® SupportAssist® module executable by the hardware processor 102 or other hardware processing resource of the information handling system 100. With SupportAssist® a user may provide input via, for example, the microphone 182 requesting information related to a setting associated with the information handling system 100. Thus, capabilities of SupportAssist® may include virus protection capabilities, setting manipulation capabilities, and software updating capabilities that may each be detected and gathered via the execution of the AI productivity tool-enablable software application capabilities gathering module 168 for use and categorization of these capabilities as described herein.

Even further, examples of an AI productivity tool-enablable software application 159 may include Dell® Display®/Peripheral Manager®. The Dell® Display®/Peripheral Manager® may have capabilities that include optimization of screen resolution, refresh rates, and gamma correction as well as webcam settings, mouse 154 settings, keyboard 148 settings, stylus 150 settings, microphone 182 settings, and trackpad 152 settings, among other settings and connections associated with the wired or wireless input/output devices 144. Again, these capabilities associated with the execution of the Dell® Display®/Peripheral Manager® subagent may be gathered by the AI productivity tool-enablable software application capabilities gathering module 168 for later categorization as described herein. It is appreciated that any AI productivity tool-enablable software application 159 may provide a listing of capabilities to be gathered by the AI productivity tool-enablable software application capabilities gathering module 168 and may include, for example, Dell® Trusted Device® subagent, a remediation Dell® APEX Managed Device Service (AMDS)® subagent, Alienware Command Center (AWCC)® subagent, among others. The capabilities of each of these AI productivity tool-enablable software applications 159 may be gathered via execution, by the hardware processor 102 or any other hardware processing device, of the AI productivity tool-enablable software application capabilities gathering module 168. It is appreciated that each of these AI productivity tool-enablable software applications 159 may also include their own AI productivity tool enablable software plug-ins 158 that interfaces with one or more AI productivity tool modules 156 to receive input from the user and engage in AI productivity operations as described herein.

The AI productivity tool subagent 160 also includes an AI productivity tool-enablable software application natural language generator 172. Execution of computer-readable program code of the AI productivity tool-enablable software application natural language generator 172 may cause specific words to be associated with the capabilities of each of the AI productivity tool-enablable software applications 159 described herein. For example, an intent value for association with the natural language description of the capabilities associated with the Dell® SupportAssist® may include "virus protection," "updating," "update," "settings," "settings optimization," and the like that describe these capabilities and may be associated with an intent vector value for those capabilities associated with one or more particular AI productivity tool-enablable software applications 159.

Each of these capability intent values for association with the natural language descriptions of these capabilities may also be associated with an ID such as an alphanumeric ID that may identify, uniquely, these capabilities in a database for example. The AI productivity tool subagent 160 also includes an AI productivity tool-enablable software application capability ID generator 170 to assign the ID to these capability intent values for association with the natural language descriptions of the capabilities. The execution of the AI productivity tool-enablable software application capability ID generator 170 and AI productivity tool-enablable software application natural language generator 172 may run concurrent with each other such that capabilities associated with each of the AI productivity tool-enablable software applications are gathered and assigned an ID.

The AI productivity tool subagent 160 further includes an AI productivity tool-enablable software application multi-vector value comparator 174. The AI productivity tool-enablable software application multi-vector value comparator 174 may compare the capability intent values within a multi-axis vector space for association with the natural language descriptions of each of the gathered capabilities associated with each of a plurality of AI productivity tool-enablable software applications. This comparison may include execution of one or more of the machine learning models 166 to compare this natural language describing each of the capabilities such that comparisons between these capabilities may be made. For example, a machine learning model 166 may include a natural language processing module that compares these capability intent values for association with the natural language descriptions for the published capabilities of each AI productivity tool-enablable software application 159 and compares them to each other within a multi-vector array. In an embodiment, the execution of the AI productivity tool-enablable software application multi-vector value comparator 174 by the hardware processor 102 or other hardware processing device of the information handling system 100 may selectively mark the gathered capabilities of each of the AI productivity tool-enablable software applications 159 as redundant AI productivity tool-enablable software application capabilities or primary AI productivity tool-enablable software application capabilities. This is done so that dynamic disambiguation between the capabilities of the AI productivity tool-enablable software applications can be determined based on the capability intent vector values for those capabilities when compared to a user query having a query intent vector value to determine a response to such a query. For example, Dell Optimizer® subagent and Dell SupportAssist® subagent may be installed on the information handling system 100. Dell® SupportAssist® subagent exposes (e.g., the execution of the AI productivity tool-enablable software application capabilities gathering module 168 gathers) a first capability "A" that has a capability intent value associated with the natural language description of "Optimize my system." Concurrently, Dell Optimizer® subagent exposes a second capability "B" that has a capability intent value associated with the natural language description of "Optimize the performance of my system." While these two AI productivity tool-enablable software applications (e.g., Dell® SupportAssist® subagent and Dell Optimizer® subagent) may have similar capabilities and also have similar intent values that may not be distinguishable by a natural language ML model, the information handling system 100 is to select between these capabilities when they are similar and overlapping capabilities and prevent confusion or collision between them during operation of the AI productivity tool module 156 by the user. By labeling similar capabilities with similar intent values from two different AI productivity tool-enablable software applications 159 as either a primary AI productivity tool-enablable software application capability or a redundant AI productivity tool-enablable software application capability, confusion, and collision of these AI productivity tool-enablable software applications to invoke optimization of the information handling system 100 is avoided.

After the labeling of each of the capabilities of each of the AI productivity tool-enablable software applications as either being a primary AI productivity tool-enablable software application capability or a redundant AI productivity tool-enablable software application capability when capability intent values are too similar and within a threshold, the execution of the AI productivity tool-enablable software application multi-vector value comparator 174 may store these capabilities with their assigned IDs within either a primary AI productivity tool-enablable software application capabilities database 178 or redundant AI productivity tool-enablable software application capabilities database 180, respectively. During operation of the methods and systems described herein, the provisioning of the labeled primary AI productivity tool-enablable software application capabilities and redundant AI productivity tool-enablable software application capabilities into either the primary AI productivity tool-enablable software application capabilities database 178 or redundant AI productivity tool-enablable software application capabilities database 180 may also change or automatically be adjusted as changes are made to the AI productivity tool-enablable software applications 159.

In an example, any given AI productivity tool-enablable software application 159 may be updated such that they include additional capabilities that might overlap with other AI productivity tool-enablable software applications. Still further, any of the AI productivity tool-enablable software applications 159 may be uninstalled such that capabilities within the redundant AI productivity tool-enablable software application capabilities database 180 are no longer redundant and may be moved into the primary AI productivity tool-enablable software application capabilities database 178 so that the capability of the AI productivity tool-enablable software application 159 may be used after input from the user has been received at the information handling system 100 directing that an AI productivity tool-enablable software application 159 be invoked to address the user's input appropriately. The AI productivity tool subagent 160 may further include an AI productivity tool-enablable software application capability replacement module 176 that addresses these changes (updating, uninstalling, etc.) to each of these AI productivity tool-enablable software applications 159.

In an embodiment, the execution of the AI productivity tool-enablable software application multi-vector value comparator 174 may implement a similarity threshold value for the capability intent values of the capabilities that determines whether the capabilities associated with each of the AI productivity tool-enablable software applications are sufficiently close enough to label one capability as a primary AI productivity tool-enablable software application capability or a redundant AI productivity tool-enablable software application capability. As described herein, the execution of one or more of the machine learning models 166 to compare this natural language describing each of the capabilities may assign a capability intent vector value within a multi-axis vector space to each capability such that these capability intent values may be compared to one another and, when the similarity intent vector value threshold it reached or exceeded, one of the competing capabilities of two different AI productivity tool-enablable software applications 159 may be labeled as a primary AI productivity tool-enablable software application capability or a redundant AI productivity tool-enablable software application capability.

When referred to as a "system," a "device," a "module," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The system, device, controller, or module can include hardware processing resources executing software, including firmware embedded at a device, such as an Intel® brand processor, AMD® brand processors, Qualcomm® brand processors, or other processors and chipsets, or other such hardware device capable of operating a relevant software environment of the information handling system. The system, device, controller, or module can also include a combination of the foregoing examples of hardware or hardware executing software or firmware. Note that an information handling system can include an integrated circuit or a board-level product having portions thereof that can also be any combination of hardware and hardware executing software. Devices, modules, hardware resources, or hardware controllers that are in communication with one another need not be in continuous communication with each other, unless expressly specified otherwise. In addition, devices, modules, hardware resources, and hardware controllers that are in communication with one another can communicate directly or indirectly through one or more intermediaries.

Figure 2:
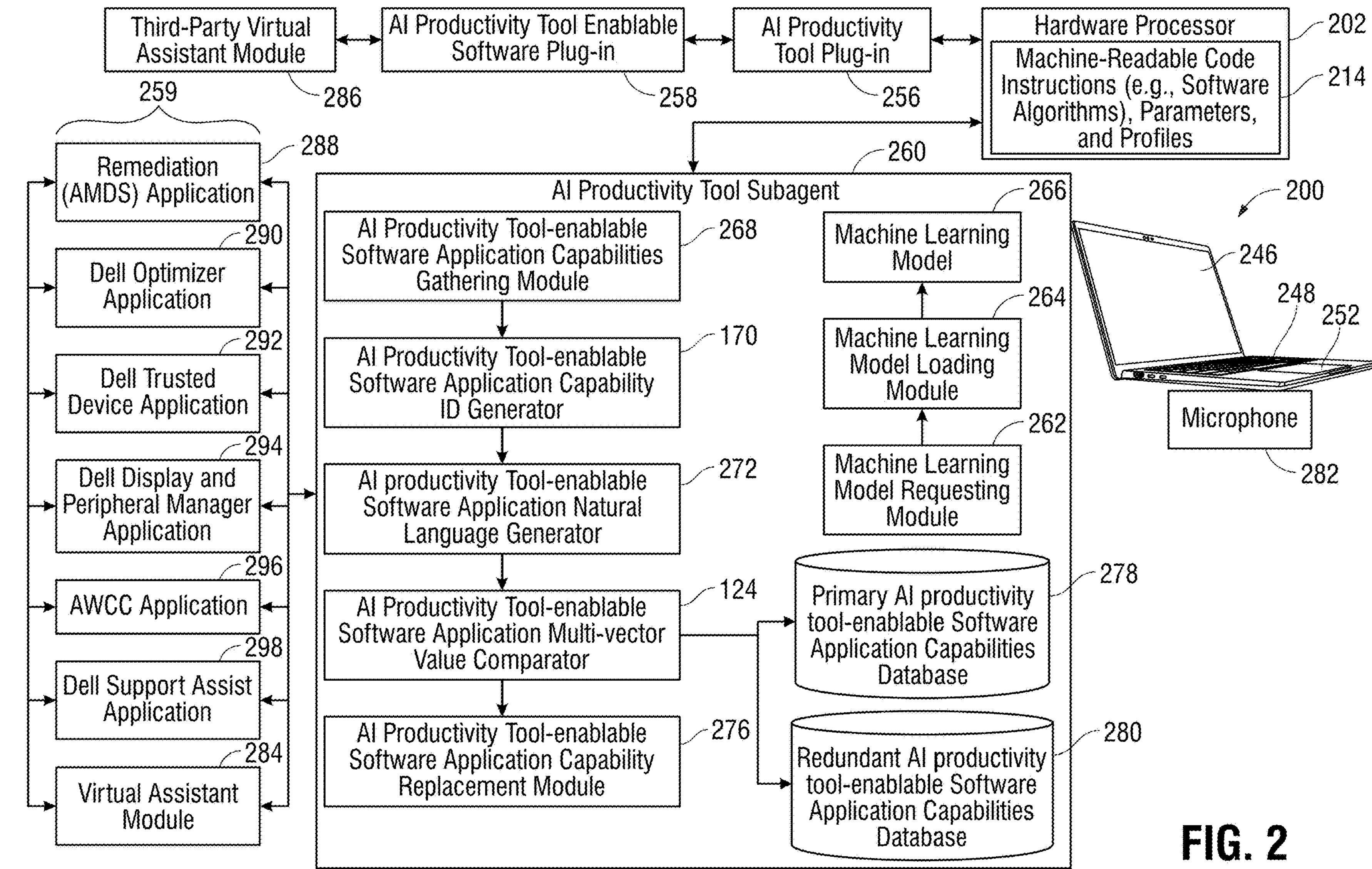
FIG. 2 is a graphic and block diagram illustrating an information handling system that includes an AI productivity tool module and an AI productivity tool subagent to select among a plurality of AI productivity tool-enablable software applications for services, operations, or responses of those AI productivity tool-enablable software applications according to another embodiment of the present disclosure.

FIG. 2 is a graphic and block diagram illustrating an information handling system 200 that includes an AI productivity tool module 256 and an AI productivity tool subagent 260 to select among a plurality of AI productivity tool-enablable software applications 259 according to another embodiment of the present disclosure. As described herein, the AI productivity tool module 256 and AI productivity tool subagent 260 may be executed by a hardware processor 102 on the information handling system 200 thereby allowing the methods described herein to be carried out on-the-box such that a wireless connection to a network is not necessary for operation of the method. In another embodiment, some modules, databases, and/or processing resources may be maintained on a remote server such that a wireless connection can be made with these remote servers and the method may be implemented as described herein.

In FIG. 2, the information handling system 200 is shown as a laptop-type information handling system 200. However, the present specification contemplates that the information handling system 200 may be any type of information handling system as described herein. The information handling system 200 in FIG. 2 includes a video display device 246 used to provide output to the user. The information handling system 200 further includes a keyboard 248 and a trackpad 252 used by the user to provide input to the information handling system 200.

As described in embodiments herein, the information handling system 200 includes an AI productivity tool module 256. The AI productivity tool module 256 may include any artificial intelligence-based productivity tool. The AI productivity tool module 256 may include chatbot features, virtual assistant features, and other artificial intelligence features that allow a user to provide input, such as a query input, to the information handling system 200 and, with generative artificial intelligence processing to execute functions, operations, or services via one or more AI productivity tool-enablable software applications 259. Examples of some AI productivity tool modules 256 may include Cortana® by Microsoft®, Copilot® by Microsoft®, Siri® by Apple® Inc., Gemini® by Google AI®, ChatGPT® by OpenAI®, and Amazon Alexa® by Amazon®, among others. It is appreciated that the information handling system 200 may include any proprietary AI productivity tool module 256 used to interface with the information handling system 200 and the operations thereon. In an embodiment, the hardware processor 102 of the information handling system 200 may execute computer-readable code instructions of the AI productivity tool module 256 with its AI productivity tool enablable software plug-ins 258 and monitor for user input at a microphone 282, keyboard 248, or other input device for the AI productivity tool module 256 to engage in AI productivity actions, software services, or responses pursuant to the user input with execution of capabilities on one or more AI productivity tool-enablable software applications 259.

The AI productivity tool module 256 may interface with the information handling system 200 (e.g., via a bus) via an AI productivity tool enablable software plug-ins 258. The AI productivity tool enablable software plug-ins 258 may be any software or firmware that allows the AI productivity tool module 256 to perform those actions at the information handling system 200 based on input (e.g., typed or spoken words) from the user and provide for interfacing with responsive capabilities at one or more AI productivity tool-enablable software applications 259. The AI productivity tool enablable software plug-ins 258 may be used by the AI productivity tool module 256 to interface with any number of AI productivity tool-enablable software applications 259 executing or executable on the information handling system 200.

The information handling system 200 also includes code instructions of an AI productivity tool subagent 260. The AI productivity tool subagent 260 may be any software and/or firmware executable by the hardware processor 202 of the information handling system 200 to interface one or more of a plurality of the AI productivity tool-enablable software applications 259 including remediation Dell® APEX Managed Device Service (AMDS)® application module 288, Dell Optimizer® subagent 290, Dell® Trusted Device® application module 292, Dell® Display/Peripheral Manager® application module 294, AWCC® application module 296, Dell® SupportAssist® application module 298 and others to provide AI enabled features within those AI productivity tool-enablable software applications 259. In an embodiment, the AI productivity tool subagent 260 may further have plural software modules and access to databases that may be used to direct the execution of various AI productivity tool-enablable software applications 259 modules described herein. Additionally, the AI productivity tool subagent 260 may be provided with access to the BIOS and OS of the information handling system 200 to conduct the AI productivity actions pursuant to the user's input provided at the AI productivity tool module 256.

In an embodiment, the AI productivity tool subagent 260 may include a machine learning model requesting module 262. The machine learning model requesting module 262 may be used by the AI productivity tool subagent 260 too, when prompted via the AI productivity tool enablable software plug-ins 258 to request a specific machine learning model 266. During operation for example, the machine learning model requesting module 262 may request that one or more machine learning models 266 be loaded by the machine learning model loading module 264 such that, for example, the text or voice input from the user may be processed through a speech recognition model and/or processed through a natural language model in order to determine an intent of the user's input having an intent value in a multi-axis vector space. It is appreciated that these machine learning models 266 may include one or more models that work together to both decipher the user's intent for an intent value while also conducting operations at the information handling system 200 to provide feedback to the user such as creating AI generated text at a word processing application being executed by the hardware processor 202 on the information handling system 200, for example.

In an embodiment, the AI productivity tool subagent 260 also includes an AI productivity tool-enablable software application capabilities gathering module 268. The AI productivity tool-enablable software application capabilities gathering module 268 may be executed by the hardware processor 202, the EC 204, the GUI 206, or any other hardware processing device. The AI productivity tool-enablable software application capabilities gathering module 268 may gather capabilities published or otherwise associated with each of a plurality of AI productivity tool-enablable software applications 259. These capabilities gathered by the AI productivity tool-enablable software application capabilities gathering module 268 may include any input and output capabilities provided by the AI productivity tool-enablable software applications 259 being executed by the hardware processor 202 or any other processing devices. For example, an AI productivity tool-enablable software application 259 may include a word processing application such as Microsoft® Word® that may receive input (e.g., via voice at a microphone 282 or text via a keyboard 248) and provide output via text. Still further, other examples of an AI productivity tool-enablable software application 259 may include an updating software, virus protection software, and setting optimization software such as Dell® SupportAssist® 298 executable by the hardware processor 202 or other hardware processing resource of the information handling system 200. With SupportAssist® 298 a user may provide input via, for example, the microphone 282 requesting information related to a setting associated with the information handling system 200. Thus, a capability of SupportAssist® 298 may include virus protection capabilities, setting manipulation capabilities, and software updating capabilities that may each be detected and gathered via the execution of the AI productivity tool-enablable software application capabilities gathering module 268 for use and categorization of these capabilities and establishing intent values for these capabilities such that chat query input intent values may be correlated with one or more capability intent values in embodiments herein as described herein.

Even further, examples of an AI productivity tool-enablable software application 259 may include Dell® Display®/Peripheral Manager® 294. The Dell® Display®/Peripheral Manager® 294 may have capabilities that include optimization of screen resolution, refresh rates, and gamma correction as well as webcam settings, mouse settings, keyboard 248 settings, stylus settings, microphone 282 settings, and trackpad 252 settings, among other settings and connections associated with the wired or wireless input/output devices. Again, these capabilities associated with the execution of the Dell® Display®/Peripheral Manager® 294 may be gathered by the AI productivity tool-enablable software application capabilities gathering module 268 for later categorization and establishing intent values for these capabilities such that chat query input intent values may be correlated with one or more capability intent values in embodiments herein. It is appreciated that any AI productivity tool-enablable software application 259 may provide, publish, or otherwise be associated with a listing of capabilities to be gathered by the AI productivity tool-enablable software application capabilities gathering module 268 and may include, for example, Dell® Trusted Device® 292, a remediation Dell® APEX Managed Device Service (AMDS)® subagent 296, Alienware Command Center (AWCC)® subagent 296, among others. The capabilities of each of these AI productivity tool-enablable software applications may be gathered via execution, by the hardware processor 202 or any other hardware processing device, of the AI productivity tool-enablable software application capabilities gathering module 268 and include capability intent values in a multi-axis vector space for those capabilities. It is appreciated that each of these AI productivity tool-enablable software applications may also include their own AI productivity tool enablable software plug-ins 258 that interfaces with one or more AI productivity tool modules 256 to receive input from the user and engage in AI productivity operations as described herein.

The AI productivity tool subagent 260 also includes an AI productivity tool-enablable software application natural language generator 272. Execution of computer-readable program code of the AI productivity tool-enablable software application natural language generator 272 may cause specific words yielding a set of intent values to be associated with the capabilities of each of the AI productivity tool-enablable software applications 259 for the capability intent values described herein. For example, a capability intent value for association with the natural language description of the capabilities associated with the Dell® SupportAssist® may include "virus protection," "updating," "update," "settings," "settings optimization," and the like that describe these capabilities.

Each of these capability intent values for association with the natural language descriptions of these capabilities may also be associated with an ID such as an alphanumeric ID that may identify, uniquely, these capabilities in a database for example. The AI productivity tool subagent 260 also includes an AI productivity tool-enablable software application capability ID generator 270 to assign the ID to these capability intent values for association with the natural language descriptions of the capabilities. The execution of the AI productivity tool-enablable software application capability ID generator 270 and AI productivity tool-enablable software application natural language generator 272 may run concurrent with each other such that capabilities associated with each of the AI productivity tool-enablable software applications and any capability intent values are gathered and assigned an ID.

The AI productivity tool subagent 260 further includes an AI productivity tool-enablable software application multi-vector value comparator 274. The AI productivity tool-enablable software application multi-vector value comparator 274 may compare the capability intent values for association with the natural language descriptions of each of the gathered capabilities associated with each of a plurality of AI productivity tool-enablable software applications. This comparison may include execution of one or more of the machine learning models 266 to compare this natural language and associated one more capability intent values in vector space describing each of the capabilities such that comparisons between these capabilities may be made as to closeness of the capability intent vector values in the multi-axis vector space. For example, a machine learning model 266 may include a natural language processing module that compares these one or more capability intent values for association with the natural language descriptions for plural capabilities in the multi-axis vector space and compares them to each other within a multi-vector array. In an embodiment, the execution of the AI productivity tool-enablable software application multi-vector value comparator 274 by the hardware processor 202 or other hardware processing device of the information handling system 200 may selectively mark the gathered capabilities of each of the AI productivity tool-enablable software applications as primary AI productivity tool-enablable software application capabilities or redundant AI productivity tool-enablable software application capabilities when two capabilities have a closeness of the capability intent values in the multi-axis vector space falling within a threshold of similarity. This is done so that dynamic disambiguation of chat queries with query intent values may be associated or matched to a capability that is distinguishable among the intent vector values of capabilities of plural AI productivity tool-enablable software applications 259 even when those capabilities are close or overlapping. For example, Dell Optimizer® subagent 290 and Dell® SupportAssist® module 298 may be installed on the information handling system 200. Dell® SupportAssist® module 298 exposes (e.g., the execution of the AI productivity tool-enablable software application capabilities gathering module 268 gathers) a first capability "A" that is assigned a capability intent value for association with the natural language description in vector space for optimization task capabilities that correlate closely to a natural language chatbot query intent for "Optimize my system." Concurrently, Dell Optimizer® subagent 290 exposes a second capability "B" that is assigned a capability intent value for association with the natural language description of the capability for performance optimization task capabilities that correlate might closely to a natural language chatbot query intent value for "Optimize the performance of my system." These two AI productivity tool-enablable software applications (e.g., Dell® SupportAssist® module 298 and Dell Optimizer® subagent 290) may have similar capabilities, and disambiguation between them is required for the information handling system 200 to handle these capabilities differently despite their similar capabilities and prevent confusion between them during operation of the AI productivity tool module 256 by the user. If the capabilities "A" and "B" have capability vector values within a closeness threshold, then labeling similar capabilities from two different AI productivity tool-enablable software applications as either a primary AI productivity tool-enablable software application capability or a redundant AI productivity tool-enablable software application capability may avoid confusion and collision regarding operations of these AI productivity tool-enablable software applications to invoke to optimize the information handling system 200.

After the labeling of each of the capabilities of each of the AI productivity tool-enablable software applications as either being a primary AI productivity tool-enablable software application capability or a redundant AI productivity tool-enablable software application capability, the execution of the AI productivity tool-enablable software application multi-vector value comparator 274 may store these capabilities with their assigned IDs within either a primary AI productivity tool-enablable software application capabilities database 278 or redundant AI productivity tool-enablable software application capabilities database 280, respectively. During operation of the methods and systems described herein, the provisioning of the labeled primary AI productivity tool-enablable software application capabilities and redundant AI productivity tool-enablable software application capabilities into either the primary AI productivity tool-enablable software application capabilities database 278 or redundant AI productivity tool-enablable software application capabilities database 280 may change as changes are made to the AI productivity tool-enablable software applications.

In an example, any given AI productivity tool-enablable software application 259 may be updated such that they include additional capabilities that might overlap with other AI productivity tool-enablable software applications 259. Still further, any of the AI productivity tool-enablable software applications 259 may be uninstalled such that capabilities within the redundant AI productivity tool-enablable software application capabilities database 280 are no longer redundant and may be moved into the primary AI productivity tool-enablable software application capabilities database 278 so that the capability of the alternate AI productivity tool-enablable software application 259 may be used after input from the user has been received at the information handling system 200 directing that an AI productivity tool-enablable software application 259 be invoked to address the user's chatbot or other query input appropriately. The AI productivity tool subagent 260 may further include an AI productivity tool-enablable software application capability replacement module 276 that addresses these changes (updating, uninstalling, etc.) to each of these AI productivity tool-enablable software applications 259.

In an embodiment, the execution of the AI productivity tool-enablable software application multi-vector value comparator 274 may implement a similarity threshold value that determines whether the capability intent values for capabilities associated with each of the AI productivity tool-enablable software applications 259 are sufficiently close enough to label one capability as a primary AI productivity tool-enablable software application capability or another as a redundant AI productivity tool-enablable software application capability. As described herein, the execution of one or more of the machine learning models 266 to compare this natural language capability intent value describing each of the capabilities may assign this capability intent value to each capability such that these capability intent values may be compared to one another and, when the similarity threshold value it reached or exceeded, one of the competing capabilities of two different AI productivity tool-enablable software applications 259 may be labeled as a primary AI productivity tool-enablable software application capability while another may be labeled as a redundant AI productivity tool-enablable software application capability.

During operation, the user may provide input, such as chatbot query input, to the information handling system 200 via the microphone 282, keyboard, or other input device. As described herein, one of a third-party virtual assistant module 286 or a virtual assistant module 284 may be executed by the hardware processor 102 or other hardware processing device in order to receive this input and provide that input to the AI productivity tool module 256. The AI productivity tool module 256 may interface with the AI productivity tool subagent 260 via an AI productivity tool enablable software plug-ins 258 in order to cause a machine learning model requesting module 262 to invoke one or more machine learning models 266 via a machine learning model loading module 264. During operation for example, the machine learning model requesting module 262 may request that one or more machine learning models 266 be loaded by the machine learning model loading module 264 such that, for example, the text or voice query input from the user may be processed through a speech recognition model and/or processed through a natural language model in order to determine a query intent value of the user's query input. This chatbot query input intent value may then be matched or correlated to a closest capability intent value for published capabilities in the multi-axis vector space to find an AI productivity tool-enablable software applications 259 to execute a responsive capability for operations, software services, or generating a response to meet the chatbot input query. The output from these machine learning models 266 may, in some embodiments, cause one or more of the plurality of the AI productivity tool-enablable software applications 259 to provide AI enabled features for capabilities within those AI productivity tool-enablable software applications 259, for example Dell® APEX Managed Device Service (AMDS)® application 288, Dell Optimizer® application 290, Dell® Trusted Device® application 292, Dell® Display/Peripheral Manager® application 294, AWCC® application 296, Dell® SupportAssist® module 298 and others. It is contemplated that any of the computer-readable code instructions of AI productivity tool-enablable software applications 259 may be a subagent software application that may also interface with remote software services or remotely supported software services and may further interface with remote cloud locations when available in some embodiments herein. In embodiments, the AI productivity tool-enablable software applications 259 may execute locally, remotely, or in some combination.

FIG. 3 is a flow diagram showing a method 300 of gathering and assessing closeness of capabilities associated with each of a plurality of AI productivity tool-enablable software applications according to embodiments herein. The plurality of AI productivity tool-enablable software applications 390, 398 may be assessed by a hardware processor executing computer readable code instructions of an AI productivity tool-enablable software application multi-vector value comparator 374 to compare the one or more capability intent values in vector space correlating to natural language descriptions of each of the gathered capabilities associated with each of a plurality of AI productivity tool-enablable software applications 390, 398 in embodiments herein. Execution of code instructions of the AI productivity tool-enablable software application multi-vector value comparator 374 may then selectively mark the gathered capabilities of each of the AI productivity tool-enablable software applications 390, 398 as primary AI productivity tool-enablable software application capabilities or redundant AI productivity tool-enablable software application capabilities when two capability intent vector values for separate capabilities of different AI productivity tool-enablable software applications 390 or 398 fall within a similarity capability intent value threshold within the vector space according to an embodiment of the present specification. The process described herein may be conducted prior to, for example, an AI productivity tool module receiving chatbot query input from a user and determining that query input intent values to perform AI productivity tasks using the AI productivity tool-enablable software applications 390, 398 are correlated to at least one closest capability intent value within a vector space to select that capability as responsive.

FIG. 3 shows two examples of an AI productivity tool-enablable software applications that include Dell Optimizer® application 390 and Dell® SupportAssist® module 398 in the example embodiment. Although these two AI productivity tool-enablable software applications 390, 398 are shown in FIG. 3, the present specification contemplates that additional and/or different AI productivity tool-enablable software applications 390,398 may be processed using the systems and methods described in various embodiments herein. During operation of the systems and methods described herein, the hardware processor of the information handling system may execute computer-readable program code instructions of an AI productivity tool-enablable software application capabilities gathering module 368. The execution of the AI productivity tool-enablable software application capabilities gathering module 368 causes the hardware processor to gather capabilities, which may be published or descriptions of capabilities generated for each AI productivity tool-enablable software application 390, 398 associated with each of a plurality of AI productivity tool-enablable software applications such as the Dell Optimizer® application 390 and Dell® SupportAssist® module 398 in embodiments herein. Capabilities of the Dell Optimizer® application 390 may include virus protection capabilities, setting manipulation capabilities, and software updating capabilities that may each be detected and gathered via the execution of the AI productivity tool-enablable software application capabilities gathering module 368 for use and categorization of these capabilities as described herein. Each capability are shown listed as "capability A.1," "capability A.2," and "capability A.3." It is appreciated that these listed capabilities are merely examples and more or fewer capabilities may be discovered via execution of the AI productivity tool-enablable software application capabilities gathering module 368.

Similarly, the execution of the AI productivity tool-enablable software application capabilities gathering module 368 may also cause capabilities associated with the Dell® SupportAssist® module 398 to be gathered as well. Again, these capabilities are listed and shown as example capabilities "capability B.1," "capability B.2," and "capability B.3." Again, it is appreciated that these listed capabilities are merely examples and more or fewer capabilities may be discovered via execution of the AI productivity tool-enablable software application capabilities gathering module 368.

The method 300 may also include a hardware processor or processing resource executing computer readable program code instructions of an AI productivity tool-enablable software application natural language generator 372. Execution of computer-readable program code of the AI productivity tool-enablable software application natural language generator 372 may cause specific words to be associated with the capabilities of each of the AI productivity tool-enablable software applications 390, 398 described herein to generate a capability intent value in a multi-axis vector space associated with each listed capability (e.g., A.1, A.2, A.3, B.1, B.2, B.3). For example, an intent value for association with the natural language description of the capabilities associated with the Dell® SupportAssist® application 398 may include descriptors such as "virus protection," "updating," "update," "settings," "settings optimization," and the like that describe these capabilities and may then yield unique capability intent values via the AI productivity tool-enablable software application natural language generator 372 associated with each of the capabilities for the Dell® SupportAssist® application 398. A set of other, potentially similar, natural language descriptions of capabilities associated with other AI productivity tool-enablable software applications such as the Dell Optimizer® application 390 may also be generated and yield unique capability intent values for the Dell Optimizer® application 390. Embodiments of the present disclosure may determine similarity of potentially overlapping capabilities among the various AI productivity tool-enablable software applications that include Dell Optimizer® application 390 or the Dell SupportAssist® application 398.

The method 300 may also include the execution of computer-readable program code instructions of an AI productivity tool-enablable software application capability ID generator 370. As described herein, the hardware processor executing code instructions of the AI productivity tool-enablable software application capability ID generator 370 creates and assigns an ID to each of the capabilities identified and its intent value or intent values. In the example embodiment in FIG. 3, the capability identifications are referred to as "capability ID A.1," "capability ID A.2," "capability ID A.3," "capability ID B.1," "capability ID B.2," and "capability ID B.3." These IDs may include any alphanumeric identification and may be stored on a data storage device on the information handling system.

The method 300 may also include the execution of an AI productivity tool-enablable software application multi-vector value comparator 374. The hardware processor executing code instructions of the AI productivity tool-enablable software application multi-vector value comparator 374 causes the hardware processor to compare the one or more capability intent values generated from the natural language descriptors of each of the gathered capabilities associated with each of a plurality of AI productivity tool-enablable software applications. This comparison may include execution of one or more of the machine learning models to compare the one or more capability intent values generated from the natural language descriptors describing each of the capabilities such that comparisons between these intent capabilities and a received query, or more particularly between the capability intent values and a query intent value, may be made. For example, a machine learning model may include a natural language processing module that disambiguates between these one or more capability intent values for natural language descriptions of plural available capabilities and may determine similarity or correlation of a received input query intent vector value to various capability intent vector values to select a correlating capability associated with a closest capability intent vector value from among plural capabilities as responsive to a received input query in embodiments herein.

Further, execution of code instructions for the AI productivity tool-enablable software application multi-vector value comparator 374 by the hardware processor 302 or other hardware processing device of the information handling system 300 may cause the plural capabilities, or more particularly the one or more capability intent values, to be compared and determined to be either too similar or not. The plural capability intent vector values for plural capabilities are compared to each other within a multi-vector array to determine if they fall within a similarity threshold value of intent vector values within a multi-axis vector space in embodiments herein. If two capability intent values for different capabilities do fall within a similarity intent vector value threshold, this determination provides information to the hardware processor such that the hardware processor may selectively mark the gathered capabilities from each of a plurality of the AI productivity tool-enablable software applications determined to be similar as either a redundant AI productivity tool-enablable software application capability or another marked as a primary AI productivity tool-enablable software application capability to be used with for responses to queries received by the AI productivity tool module in processing query inputs and comparing them to available capabilities. This is done so that dynamic disambiguation between very similar capabilities of the AI productivity tool-enablable software applications can still be determined by the AI productivity module.

For example, Dell Optimizer® application 390 and Dell SupportAssist® application 398 may be installed on the information handling system 300. Dell® SupportAssist® application 398 exposes (e.g., the execution of the AI productivity tool-enablable software application capabilities gathering module 168 gathers) a first capability "A.1" with one or more descriptions that is assigned a capability intent vector value that may correlate closely with a natural language chatbot query of "Optimize my system." Concurrently, Dell Optimizer® subagent 390 exposes a second capability "B.2" with one or more descriptors that is assigned a capability intent vector value that may correlate closely with a natural language description of "Optimize the performance of my system." While these two AI productivity tool-enablable software applications (e.g., Dell® SupportAssist® subagent 398 and Dell Optimizer® subagent 390) may have similar capabilities, the information handling system should handle these capabilities from two different AI productivity tool-enablable software applications 390, 398 differently and avoid collision despite their similar capabilities to prevent confusion between them during operation of the AI productivity tool module by the user. This may be done by labeling such similar responsive capabilities from two different AI productivity tool-enablable software applications 390, 398 as either a primary AI productivity tool-enablable software application capability or a redundant AI productivity tool-enablable software application capability to avoid confusion and collision if both of these AI productivity tool-enablable software applications 390, 398 were to invoke to optimize the information handling system.

After determining closeness of capability intent values and labeling of each of the capabilities of each of the AI productivity tool-enablable software applications as either being a primary AI productivity tool-enablable software application capability or a redundant AI productivity tool-enablable software application capability, the execution of the AI productivity tool-enablable software application multi-vector value comparator 374 may store these capabilities with their assigned IDs within either a primary AI productivity tool-enablable software application capabilities database 378 for use by the AI productivity tool module or in a redundant AI productivity tool-enablable software application capabilities database 380 for reserve, respectively. During operation of the methods and systems described herein, the provisioning of the labeled primary AI productivity tool-enablable software application capabilities and redundant AI productivity tool-enablable software application capabilities into either the primary AI productivity tool-enablable software application capabilities database 378 or redundant AI productivity tool-enablable software application capabilities database 380 determines which capabilities are used in response to a user chatbot or other query input by an AI productivity tool module for responsive operations or software services. Further, designation as primary or redundant may change as changes are made to the AI productivity tool-enablable software applications (e.g., 290, 398).

In an example, any given AI productivity tool-enablable software application (390, 398) may be updated such that they include additional capabilities that might overlap with other AI productivity tool-enablable software applications (e.g., 390, 398). Still further, any of the AI productivity tool-enablable software applications (e.g., 390, 398) may be uninstalled such that capabilities within the redundant AI productivity tool-enablable software application capabilities database 380 are no longer redundant and may be moved into the primary AI productivity tool-enablable software application capabilities database 378 so that the capability of the AI productivity tool-enablable software application may be used by an AI productivity tool module for operations or services in response to input queries from the user received at the information handling system directing that an AI productivity tool-enablable software application (e.g., 390, 398) be invoked to address the user's input query appropriately. The AI productivity tool subagent described herein may further include an AI productivity tool-enablable software application capability replacement module that addresses these changes (updating, uninstalling, etc.) to each of these AI productivity tool-enablable software applications (e.g., 390, 398).

In an embodiment, the execution of the AI productivity tool-enablable software application multi-vector value comparator 374 may implement a similarity threshold value that determines whether the one or more capability intent values for each of the capabilities associated with each of the AI productivity tool-enablable software applications (e.g., 390, 398) are sufficiently close enough to label one capability as a primary AI productivity tool-enablable software application capability or another capability as a redundant AI productivity tool-enablable software application capability. As described herein, the execution of one or more of the machine learning models to compare these one or more capability intent values from natural language describing each of the capabilities may generate this capability intent value from descriptors of the capability within a multi-axis vector space based on the natural language interpretive algorithms assigning numerical values to the terms for the one or more descriptors published for or assigned to each capability such that these capability intent values may be compared to one another. When the similarity intent value vector threshold, a mathematical value in the multi-axis vector space, is reached or exceeded (e.g., intent values are close enough within the similarity threshold to be confusingly similar), one of the competing capabilities of two different AI productivity tool-enablable software applications (e.g., 390, 398) may be labeled as a primary productivity tool-enablable software application capability or a redundant productivity tool-enablable software application capability. In this way, the AI productivity tool module upon receiving a query input from a user may select the responsive capability from just one of the AI productivity tool-enablable software applications (e.g., 390, 398) whose capability is labeled as a primary. Selection between primary AI productivity tool-enablable software application capability and a redundant AI productivity tool-enablable software application capability from between AI productivity tool-enablable software applications (e.g., 390, 398) may be based on any of several criteria according to embodiments herein. Such criteria may include selecting a desired AI productivity tool-enablable software application (e.g., 390, 398) to be labeled as primary based on recency of loading, frequency of use, subscriptions paid for, manual selection of preference by a user or IT manager, or other selection of a desired AI productivity tool-enablable software application (e.g., 390, 398) to be labeled as primary. Other criteria for selecting an AI productivity tool-enablable software application (e.g., 390, 398) to be labeled as primary may be based on its capability intent vector value being further removed in the multi-axis vector space from other capabilities available to provide for more space and easier disambiguation as more capabilities are added in other embodiments.

Figure 4:
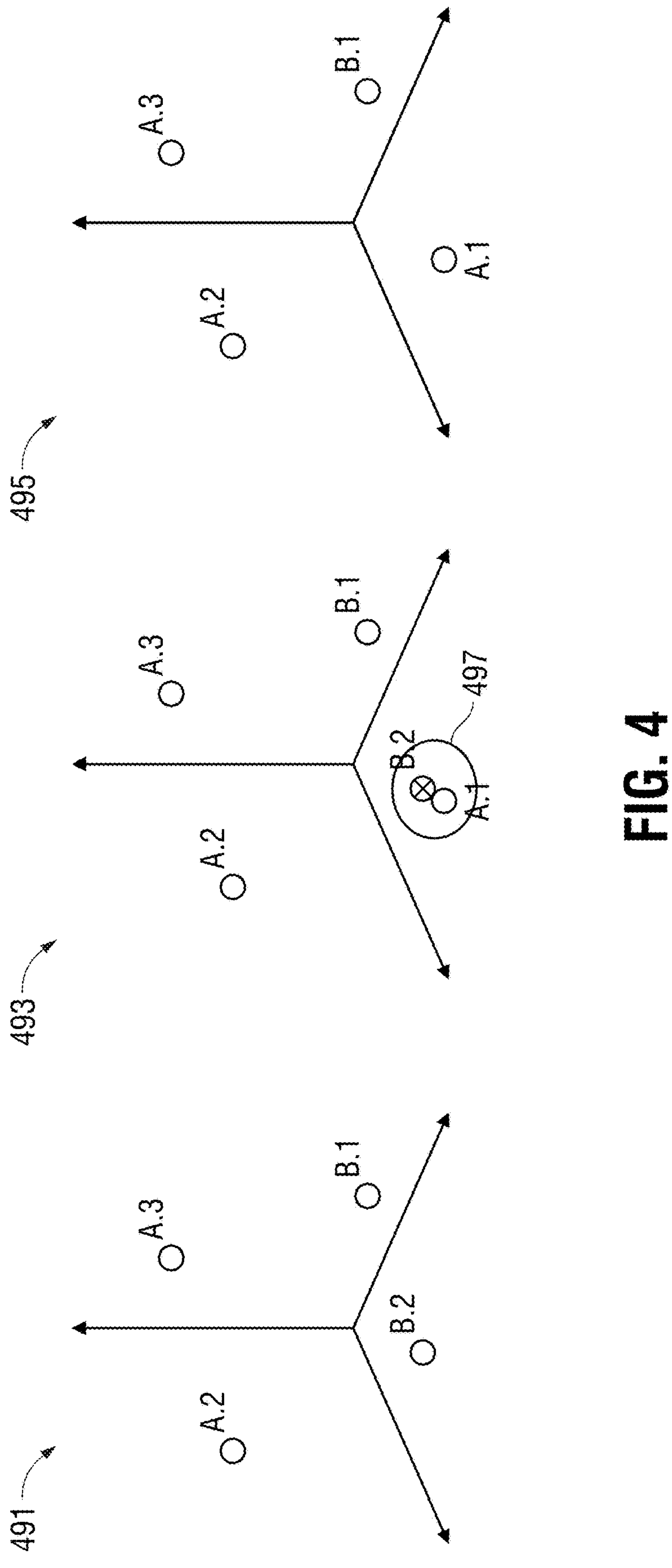
FIG. 4 is a graphic diagram of a sequence of example three-dimensional multi-axis representation of vector spaces for illustrating the process of execution of code instructions for an AI productivity tool-enablable software application multi-vector value comparator comparing the one or more capability intent values for natural language descriptions of each of the gathered capabilities associated with each of a plurality of AI productivity tool-enablable software applications using a similarity intent value threshold according to an embodiment of the present disclosure.

FIG. 4 is a graphic diagram showing a sequence of example multi-axis vector spaces 491, 493, and 495 as three-dimensional spaces for illustrating the process of execution of code instructions for an AI productivity tool-enablable software application multi-vector value comparator comparing the one or more capability intent values for natural language descriptions of each of the gathered capabilities associated with each of a plurality of AI productivity tool-enablable software applications using a similarity intent value threshold according to embodiments herein. It is appreciated that although FIG. 4 shows a diagram of example multi-axis vector spaces 491, 493, and 495 in a three-dimensional space, the illustrative plotting of any given capability intent values onto these example multi-axis vector spaces 491, 493, and 495 is meant merely for illustrative purposes indicating that a hardware processing device of the information handling system (e.g., hardware processor, GUI, EC, etc.) engages in an algorithmic process that compares the similarities of each capability intent value to each other. Actual plotting is unnecessary for the established intent vector values to be compared in embodiments herein. As described herein, computer-readable code instructions of the AI productivity tool-enablable software application multi-vector value comparator may be executed via a hardware processor to implement the similarity intent vector value threshold 497 to capability intent vector values determine similarity of two capabilities and either assign one of the capabilities of an AI productivity tool-enablable software application as either a primary AI productivity tool-enablable software application capability or assign another as a redundant AI productivity tool-enablable software application capability. While each multi-axis vector space 491, 493, and 495 shows three axes, any number of axes for the multi-axis vector spaces 491, 493, and 495 may be used in various embodiments. Indeed, many AI productivity tool-enablable software application natural language generators or other machine learning algorithms for determining intent vector values for natural language terms or phrases and contemplated for use in embodiments herein utilize intent vector values that might be illustratively plotted (e.g., compared to each other) among plural axes well above the three-axis multi-axis vector spaces 491, 493, and 495 shown in FIG. 4. For example, multi-axis vector spaces having 500 or more axis are contemplated for use with natural language algorithms with embodiments herein.

In FIG. 4, a first multi-axis vector space 491 shows that some of the capabilities labeled in FIG. 4 have capability vector intent values that have been illustratively plotted on the multi-axis vector space 491 based on the vector intent values. Again, these capabilities (e.g., A.2, A.3, B.1, B.2) may correspond to any capabilities that were discovered and gathered by the AI productivity tool-enablable software application capabilities gathering module. For simplicity of explanation, a three axis multi-axis vector space 491, 493, 495 are shown. However, as explained above many more axes are often used. In an example embodiment, a 500 or 700 axis multi-axis vector space may be used. Any number of axes that accommodate artificial intelligence natural language algorithms to be used with embodiments herein are contemplated in the present specification. At the first multi-axis vector space 491, capability intent values for capabilities A.2, A.3, B.1, B.2 have been illustratively plotted within the first multi-axis vector space 491 according to their intent values for natural language descriptions of those capabilities. In an embodiment, each potential natural language word descriptor for each capability may yield an intent vector value for the capability. Then the capability and its capability intent vector value may be assigned an individual vector ID. The capability intent vector value places the natural language word intent values of the descriptors or descriptive phrases for capabilities within the multi-axis vector space 491, 493, 495 as shown for various capabilities A.1, A.2, A.3, B.1, and B.2. A database may be present on or accessible to the information handling system that references each potential natural language word intent values of the capabilities and its corresponding vector ID. Where natural language word intent values of the capabilities are used to describe each capability A.1, A.2, A.3, B.1, B.2 these capability intent values may be variously on the multi-axis vector spaces 491, 493, 495 as shown and may be matched or correlated to a query intent vector value (not shown) within such a multi-axis vector space.

With the capability intent value A.2 for association with the natural language descriptions of a first capability illustratively plotted on the multi-axis vector space 491, additional intent vector values representing words of other natural language descriptions associated with other capabilities for capability intent values A.3, B.1 and B.2 may be compared to the illustratively currently-plotted intent vector value A.2 for that first capability. This also shows the space between capability intent vector values for disambiguation when a received query intent value is generated from a received chatbot query for correlation among the spread capability intent values A.3, B.1 and B.2 in the first multi-axis vector space 491.

In the second multi-axis vector space 493, where the capability intent vector value for the natural language wording of a new capability "A.1" has been illustratively plotted. The capability intent vector value associated with this new capability "A.1," however, places the new capability "A.1" very close to the capability intent vector value of an existing capability "B.2." As indicated by a circle around the new capability "A.1" and existing capability "B.2," a similarity threshold vector intent value 497 around the existing capability "B.2." shows that the new capability "A.1" falls within this similarity threshold vector intent value 497. The causes a hardware processor executing code instructions of the AI productivity tool-enablable software application multi-vector value comparator 274 to determine that the new capability "A.1" is too close to the existing capability "B.2." and one of these capabilities should be assigned as a redundant AI productivity tool-enablable software application capability to provide for disambiguation of these capabilities. In an embodiment, the execution of the code instructions of the AI productivity tool-enablable software application multi-vector value comparator 274 by the hardware processing device of the information handling system may include the implementation of any type of similarity algorithms that may be used to determine whether the similarity threshold has been met or exceeded. In an embodiment, these similarity algorithms may include, for example, a cosine similarity algorithm, a Euclidean/L2 distance algorithm, a dot product algorithm, a Manhattan/L1 algorithm, and the like. In an embodiment, the same similarity algorithm may be used for all comparison operations made by the AI productivity tool-enablable software application multi-vector value comparator 274.

The execution of the computer-readable program code of the AI productivity tool-enablable software application capability replacement module described herein may determine that, for example, because the new capability "A.1" originates from a preferential or higher valued AI productivity tool-enablable software application, the new capability "A.1" is to be labeled as a primary AI productivity tool-enablable software application capability while the existing capability "B.2" is labeled as a redundant AI productivity tool-enablable software application capability. For example, A.1 may be selected due to recency of its addition via its AI productivity tool-enablable software application or due to other criteria as described in embodiments herein. The existing capability "B.2" may be then stored in a redundant AI productivity tool-enablable application capabilities database. As such at the third multi-axis vector space 495, the new capability "A.1" is left within the third multi-axis vector space 495 as a primary AI productivity tool-enablable software application capability while the existing capability "B.2" is removed from within the multi-axis vector space 491, 493, 495.

In another embodiment, a primary AI productivity tool-enablable software application capability is selected based on its vector intent value (e.g., A.1) being illustratively plotted onto the multi-axis vector space (e.g., 493) further away from the other, existing, primary AI productivity tool-enablable software application capabilities A.2, A.3 and B.2 as represented by their respective vector intent values and illustratively plotted (e.g., A.2, A.3, B.1) on the second multi-axis vector space (e.g., 493). In this example embodiment, because the intent vector value of the AI productivity tool-enablable software application represented by B.2 is closer to illustratively plotted intent vector values A.2, B.1, and A.3, the AI productivity tool-enablable software application represented by B.2 is assigned as a redundant AI productivity tool-enablable software application capability while the AI productivity tool-enablable software application represented by A.1 is assigned as a primary AI productivity tool-enablable software application capability. This creates a series of illustratively plotted intent vector values associated with a plurality of AI productivity tool-enablable software applications to be illustratively plotted the furthest away from each other in vector space to maintain an easier disambiguation as the processes and methods described herein are executed during operation of the information handling system.

It is appreciated that this process may be repeated for any given gathered capability. Additionally, if and when an AI productivity tool-enablable software application is updated or uninstalled at the information handling system, the illustratively plotted capabilities represented by capability intent vector values may also be updated to define which capabilities are to be labeled as primary AI productivity tool-enablable software application capabilities or redundant AI productivity tool-enablable software application capabilities. Indeed, where the AI productivity tool-enablable software application associated with the new capability "A.1" shown in FIG. 4 is uninstalled, the AI productivity tool-enablable software application capability replacement module described herein may replace this new capability "A.1" with the existing capability "B.2" because the existing capability "B.2" had previously been labeled as a redundant AI productivity tool-enablable software application capability and can now be used instead.

Figure 5:
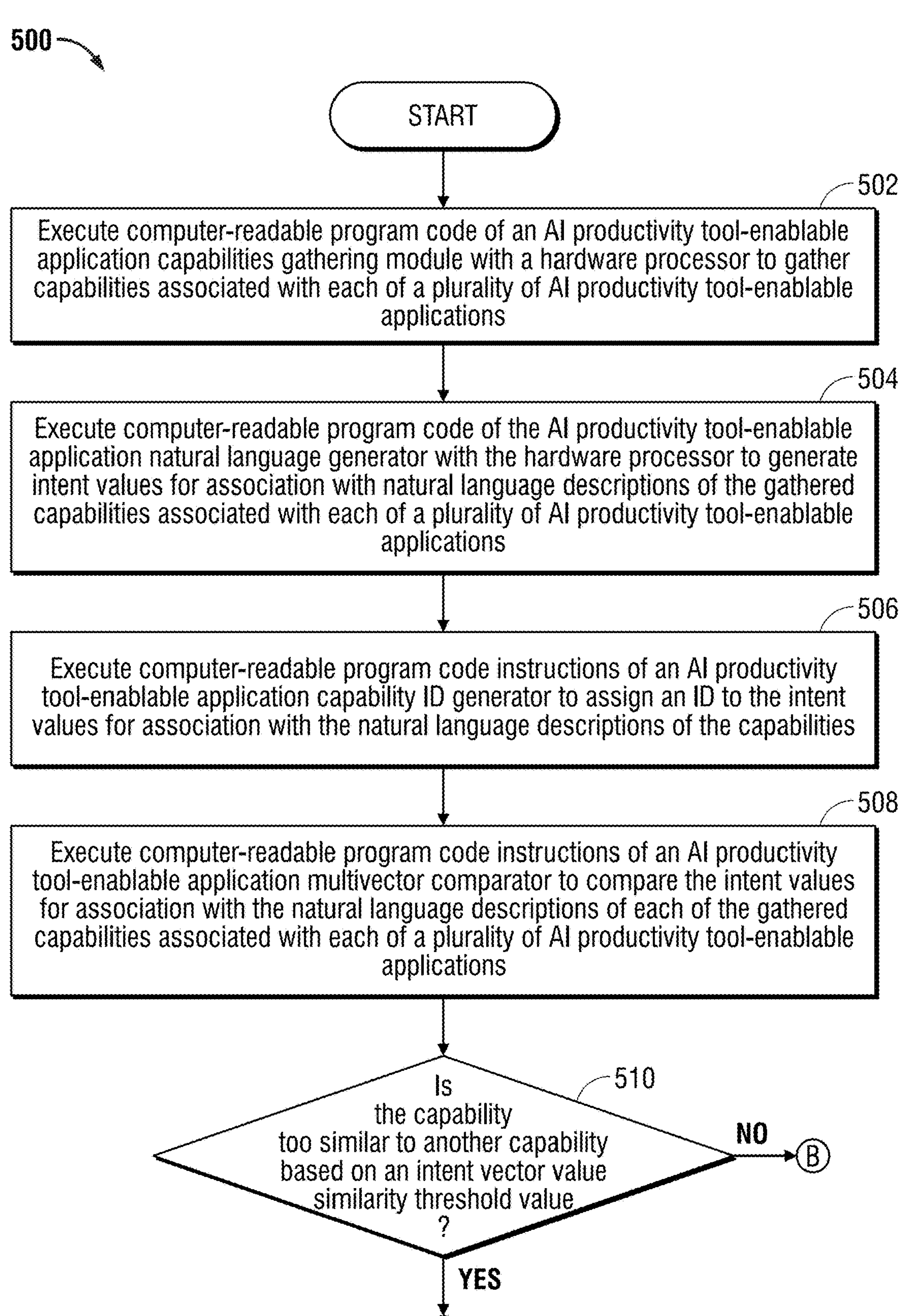
FIG. 5 is a flowchart showing a method of selecting between AI productivity tool-enablable software applications for services, operations, or other responses of the AI productivity tool-enablable software applications responsive to an AI productivity tool user query via an AI productivity tool module according to an embodiment of the present disclosure.

FIG. 5 is a flowchart 500 showing a method of selecting between AI productivity tool-enablable software applications during an AI productivity tool query received via an AI productivity tool module according to an embodiment of the present disclosure. It is appreciated that the method 500 described herein may be executed via execution of computer readable program code instructions in firmware or software by a hardware processor or other hardware processing device on an information handling system.

The method 500 may include, at block 502, executing computer-readable program code instructions of an AI productivity tool-enablable software application capabilities gathering module via a hardware processor, hardware controller or other hardware processing resource to gather capabilities associated with each of a plurality of AI productivity tool-enablable software applications. These capabilities gathered by the AI productivity tool-enablable software application capabilities gathering module may include any input and output capabilities provided by the AI productivity tool-enablable software applications being executed or to be executed by the hardware processor or any other processing devices of an information handling system. For example, an AI productivity tool-enablable software application may include a word processing application such as Microsoft® Word® that may receive input (e.g., via voice at a microphone or text via a keyboard) and provide output via text. Still further, other examples of an AI productivity tool-enablable software application may include a software updating system, virus protection software, and setting optimization software such as Dell® SupportAssist® module that are code instructions executable by the hardware processor or other hardware processing resource of the information handling system. With SupportAssist®, a user may provide input via, for example, the microphone requesting information related to a setting associated with the information handling system. Thus, capabilities of SupportAssist® may include virus protection capabilities, setting manipulation capabilities, and software updating capabilities that may each be detected and gathered via the execution of the AI productivity tool-enablable software application capabilities gathering module for use and categorization of these capabilities as described herein.

Even further, examples of an AI productivity tool-enablable software application may include Dell® Display®/Peripheral Manager®. The Dell® Display®/Peripheral Manager® may be computer-readable program code instructions that have capabilities that include optimization of screen resolution, refresh rates, and gamma correction as well as webcam settings, mouse settings, keyboard settings, stylus settings, microphone settings, and trackpad settings, among other settings and connections associated with the wired or wireless input/output devices. Again, these capabilities associated with the execution of the Dell® Display®/Peripheral Manager® subagent may be gathered by the AI productivity tool-enablable software application capabilities gathering module for later determination of capability vector intent values and categorization as described herein. It is appreciated that any AI productivity tool-enablable software application of computer-readable program code instructions in software, firmware, or some combination that may publish or provide a listing of capabilities to be gathered by the AI productivity tool-enablable software application capabilities gathering module. For example, each AI productivity tool-enablable software application publish or have assigned to it one or more descriptor terms or phrases for capabilities of the AI productivity tool-enablable software application for use with an AI productivity tool module, such as for with a chatbot natural language system. Further examples of AI productivity tool-enablable applications may include, for example, Dell® Trusted Device® application, a remediation Dell® APEX Managed Device Service (AMDS)® AI productivity tool-enablable software application, Alienware Command Center (AWCC)® AI productivity tool-enablable software application, among others. The capabilities of each of these AI productivity tool-enablable software applications, including descriptors associated with those capabilities, may be gathered via execution, by the hardware processor or any other hardware processing device, of the AI productivity tool-enablable software application capabilities gathering module. It is appreciated that each of these AI productivity tool-enablable software applications may also include their own AI productivity tool plug-in set of code instructions that interfaces with one or more AI productivity tool modules to receive input from the user and engage in AI productivity operations with specific AI productivity tool-enablable applications as described herein.

At block 504, the method 500 includes an information handling system hardware processor, hardware controller, or other hardware processing resource executing computer-readable program code of the AI productivity tool-enablable software application natural language generator to generate capability intent values for association with the natural language description intent values of the descriptors for those gathered capabilities associated with each of a plurality of AI productivity tool-enablable software applications. Execution of computer-readable program code of the AI productivity tool-enablable software application natural language generator may cause the specific words or descriptors associated with the capabilities of each of the AI productivity tool-enablable software applications described herein to be used to generate capability intent vector values for those capabilities. For example, a capability intent value for association with the natural language description of the various capabilities associated with the Dell® SupportAssist® may include descriptors such as "virus protection," "updating," "update," "settings," "settings optimization," and the like that describe these capabilities. Similar or other descriptors may be associated with a plurality of other capabilities for additional AI productivity tool-enablable software applications in embodiments herein.

Each of these capability intent vector values for association with the natural language descriptions of these capabilities and their capability intent vector values may also be associated with an ID such as an alphanumeric ID that may identify, uniquely, these capabilities for storage in a database for example or for publication, storage, and use with embodiments herein.

At block 506, the hardware processor, hardware controller, or other hardware processing resource may execute computer-readable program code instructions of an AI productivity tool-enablable software application capability ID generator. The AI productivity tool-enablable software application capability ID generator may assign an ID to these capability intent vector values for association with the natural language descriptions or capabilities and their capability intent vector values of the various capabilities. The execution of the AI productivity tool-enablable software application capability ID generator and AI productivity tool-enablable software application natural language generator may run concurrent with each other such that capabilities associated with each of the AI productivity tool-enablable software applications are gathered and a capability intent vector value generated for, and an ID assigned to the same.

At block 508, a hardware processor, a hardware controller, or other hardware processing resource executes computer-readable program code instructions of an AI productivity tool-enablable software application multi-vector value comparator to compare the capability intent values for association with the natural language descriptors of each of the gathered capabilities associated with each of a plurality of AI productivity tool-enablable software applications. This comparison may include execution of computer-readable program code instructions of one or more of the machine learning models of the AI productivity tool sub-agent to compare the capability intent vector values for the natural language descriptors or phrases describing each of the capabilities such that comparisons between these capabilities may be made. For example, a machine learning model may include executing computer-readable program code instructions of a natural language processing module that compares these capability intent vector values for association with the natural language descriptions based on their capability intent vector values for those descriptors or phrases for the capability descriptions of each of the AI productivity tool-enablable software applications. The productivity tool-enablable software application multi-vector value comparator may then execute to compare capability intent vector values to each other within a multi-vector array.

At block 510, the hardware processor, a hardware controller, or other hardware processing resource executes computer-readable program code instructions of an AI productivity tool-enablable software application multi-vector value comparator to make this comparison to determine if any two capabilities are too similar using a similarity intent value threshold in comparing capability intent vector values. In an embodiment, the execution of the AI productivity tool-enablable software application multi-vector value comparator by the hardware processor, a hardware controller, or other hardware processing resource of the information handling system may selectively mark the gathered capabilities of each of the AI productivity tool-enablable software applications as redundant AI productivity tool-enablable software application capabilities or primary AI productivity tool-enablable software application capabilities depending on similarity determinations. This is done so that dynamic disambiguation between the various capabilities of the AI productivity tool-enablable software applications can be determined with avoidance or prevention of collision or confusion between capabilities from distinct AI productivity tool-enablable applications on an information handling system. For example, a Dell® SupportAssist® application exposes (e.g., the execution of the AI productivity tool-enablable software application capabilities gathering module gathers) a first capability "A" that is assigned a capability intent value for association with the natural language descriptors that may be associated with optimization and may correlate with a query intent of "Optimize my system." Concurrently, a Dell Optimizer® application exposes a second capability "B" that is assigned a capability intent value for association with the natural language descriptors that may be associated with optimization and may correlate with a query intent of "Optimize the performance of my system." While these two AI productivity tool-enablable software applications (e.g., Dell® SupportAssist® application and Dell Optimizer® application) may have similar capabilities, the information handling system is to handle these capabilities differently despite their similar capabilities and prevent confusion between them during operation of the AI productivity tool module by the user. By labeling similar capabilities from two different AI productivity tool-enablable software applications as either a primary AI productivity tool-enablable software application capability or a redundant AI productivity tool-enablable software application capability, confusion regarding which of these AI productivity tool-enablable software applications to invoke to optimize the information handling system is avoided.

Therefore, at block 510 where the capability intent vector values of the capability is not too similar to another capability (e.g., via comparison using the intent vector value similarity threshold value), the method 500 includes labeling the capability as a primary AI productivity tool-enablable software application capability at block 514. In this example embodiment, the AI productivity tool-enablable software application associated with this capability will be executed or invoked when such a capability is to be used to provide AI productivity tool module responsive outputs to an input query. However, at block 510, where the capability intent vector value of a capability is too similar to another capability (e.g., via comparison using the similarity threshold value), the method 500 includes further determining whether one of the two similar capabilities are associated with a preferred or desired AI productivity tool-enablable software application based on any of the criteria described in embodiments herein at block 512. In other embodiments, a capability intent vector value that is further from all other capability intent vector values in a vector space may be selected as a primary AI productivity tool-enablable software application capability at block 512 as described herein. In an example embodiment, a priority listing by a user or IT manager for the AI productivity tool-enablable software applications may be formed such that those capabilities that are too similar to each other allow for selection of such a prioritized AI productivity tool-enablable software application over other capabilities that are associated with other AI productivity tool-enablable software applications that are of lower priority on this priority listing. In another example embodiment, a primary AI productivity tool-enablable software application capability is selected based on its vector intent value (and would be illustratively plotted onto the multi-axis vector space) being further away from the other, existing, primary AI productivity tool-enablable software application capabilities as represented by their respective capability vector intent values (as could be illustratively plotted on the multi-axis vector space) as described herein at, for example, FIG. 4.

At block 512, therefore, where the capability is associated with the desired AI productivity tool-enablable software application or the intent vector value of a capability is further from others capability intent values in the vector space of capabilities or some other criteria is used to select between capabilities determined to be too similar, the method 500 includes labeling the selected capability as a primary AI productivity tool-enablable software application capability at block 514 as described. However, where the capability is not associated with a preferred AI productivity tool-enablable software application or is not, the method 500 includes labeling the capability as a redundant AI productivity tool-enablable software application capability at block 516.

After the labeling of each of the capabilities of each of the AI productivity tool-enablable software applications as either being a primary AI productivity tool-enablable software application capability or a redundant AI productivity tool-enablable software application capability, the execution of the AI productivity tool-enablable software application multi-vector value comparator may store these capabilities with their assigned IDs within either a primary AI productivity tool-enablable software application capabilities database 515 or redundant AI productivity tool-enablable software application capabilities database 517, respectively. In some embodiments, capabilities may have not competing capabilities within a similarity capability intent vector value threshold and may, thus, be included as primary AI productivity tool-enablable software application capabilities with the primary AI productivity tool-enablable software application capabilities database 515 The primary AI productivity tool-enablable software application capabilities database 515 is used by the AI productivity tool module along with the AI productivity tool plug-ins to use a selected AI productivity tool-enablable application to provide operations, services, or responses that are responsive to an input query from a user into the AI productivity tool module such as via audio, text, or other types of input.

In an example, any given AI productivity tool-enablable software application may be updated such that they include additional capabilities that might overlap with other AI productivity tool-enablable software applications. Still further, any of the AI productivity tool-enablable software applications may be uninstalled or updated to remove capabilities such that capabilities within the redundant AI productivity tool-enablable software application capabilities database are no longer redundant and may be moved into the primary AI productivity tool-enablable software application capabilities database so that the capability of the AI productivity tool-enablable software application may be used after input from the user has been received at the information handling system directing that an AI productivity tool-enablable software application be invoked to address the user's input appropriately.

At block 518, therefore, the hardware processor may determine whether an AI productivity tool-enablable software application has been updated or uninstalled. Where no AI productivity tool-enablable software application has been updated or uninstalled at block 518, the method 500 may end. However, where, at block 518, the hardware processor of the information handling system has determined that an AI productivity tool-enablable software application has either been updated or uninstalled, the method 500 continues to block 520.

At block 520, the hardware processor of the information handling system may execute computer-readable program code instructions of an AI productivity tool-enablable software application capability replacement module to addresses these changes (updating, uninstalling, etc.) to each of these AI productivity tool-enablable software applications. In an embodiment, where the capabilities have been changed or lost due to an update or uninstallation, respectively, of an AI productivity tool-enablable software application, the hardware processor may change a redundant AI productivity tool-enablable software application capability to a primary AI productivity tool-enablable software application capability to replace these lost capabilities. Thus, the redundant AI productivity tool-enablable software application capabilities are still maintained in the redundant AI productivity tool-enablable software application capabilities database so that where any primary AI productivity tool-enablable software application capabilities are missing or removed, available capabilities may take their place. At this point, the method 500 may end.

The blocks of the flow diagram of FIG. 5 or steps and aspects of the operation of the embodiments herein and discussed herein need not be performed in any given or specified order. It is contemplated that additional blocks, steps, or functions may be added, some blocks, steps or functions may not be performed, blocks, steps, or functions may occur contemporaneously, and blocks, steps, or functions from one flow diagram may be performed within another flow diagram.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The subject matter described herein is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of executing code instructions for selecting between artificial intelligence (AI) productivity tool-enablable applications for an AI productivity tool module in responding to an AI productivity tool input query comprising:

executing, via a hardware processor, computer-readable program code instructions of an AI productivity tool-enablable software application capabilities gathering module to gather capabilities associated with each of a plurality of AI productivity tool-enablable software applications;

executing, via the hardware processor, computer-readable program code instructions of an AI productivity tool-enablable software application natural language generator with the hardware processor to generate capability intent values for association with natural language descriptions of the gathered capabilities associated with each of a plurality of AI productivity tool-enablable software applications;

executing, via the hardware processor, computer-readable program code instructions of an AI productivity tool-enablable software application multi-vector value comparator to compare the capability intent values associated with the natural language descriptions of each of the gathered capabilities for a plurality of the AI productivity tool-enablable software applications using a similarity vector value threshold; and selecting, via the hardware processor, a first AI productivity tool-enablable software application capability of a first AI productivity tool-enablable software application as part of primary AI productivity tool-enablable software application capabilities and selecting a second AI productivity tool-enablable software application capability of a second AI productivity tool-enablable software application as part of redundant AI productivity tool-enablable software application capabilities when first AI productivity tool-enablable software application capability and the second AI productivity tool-enablable software application capability have capability intent values within the similarity vector value threshold of each other.

2. The method of claim 1 further comprising:

executing computer-readable program code instructions of the AI productivity tool module with the hardware processor to prioritize using a selected primary AI productivity tool-enablable software application capabilities for the first AI productivity tool-enablable software application to interface with the execution of the AI productivity tool module to execute an operation, service, or response using the selected primary AI productivity tool-enablable application capability to respond to the AI productivity tool input query from a user.

3. The method of claim 1 further comprising:

executing computer-readable program code instructions of an AI productivity tool-enablable software application capability replacement module by the hardware processor to determine when the first AI productivity tool-enablable software application and first AI productivity tool-enablable software application capability from the primary AI productivity tool-enablable software application capabilities is uninstalled or updated; and replace any missing primary AI productivity tool-enablable software application capabilities with the second AI productivity tool-enablable software application capability from the redundant AI productivity tool-enablable software application capabilities into the primary AI productivity tool-enablable capabilities to respond to the AI productivity tool input query from a user.

4. The method of claim 1 further comprising:

executing a machine learning model requesting module by the hardware processor to interface with the AI productivity tool to determine which of the AI productivity tool-enablable software applications from a primary AI productivity tool-enablable capabilities database of primary AI productivity tool-enablable software applications corresponds to execute operations, to respond, or provide software services in response to the AI productivity tool input query from a user.

5. The method of claim 1 further comprising:

identify, via the hardware processor, the gathered capabilities of each of the AI productivity tool-enablable software applications as primary AI productivity tool-enablable software application capabilities when their capability intent values are not within the similarity vector value threshold of another capability intent value.

6. The method of claim 1, wherein the first AI productivity tool-enablable software application capability is selected to be part of the primary AI productivity tool-enablable software application capabilities over the second AI productivity tool-enablable software application capability based on a determination that the capability intent value of the first AI productivity tool-enablable software application capability is more distinct from other capability intent values associated with the gathered capabilities in a multi-axis vector space than the second AI productivity tool-enablable software application capability.

7. The method of claim 1 further comprising:

storing data describing the capability intent value of each of the redundant AI productivity tool-enablable software application capabilities, including the second AI productivity tool-enablable software application capability in a redundant AI productivity tool-enablable software application capabilities database.

8. The method of claim 1 further comprising:

storing data describing the capability intent values of each of the primary AI productivity tool-enablable software application capabilities in a primary AI productivity tool-enablable software application capabilities database for access by the AI productivity tool in responding to the AI productivity tool input query from a user.

9. An information handling system comprising:

a hardware processor to execute computer-readable program code instructions of an AI productivity tool-enablable software application capabilities gathering module to gather capabilities associated with each of a plurality of AI productivity tool-enablable software applications operating on the information handling system for use with an AI productivity tool software system for accepting user input queries via text or voice inputs;

the hardware processor to execute computer-readable program code instructions of an AI productivity tool-enablable software application natural language generator to generate capability intent values for association with natural language descriptors for the gathered capabilities associated with each of the plurality of AI productivity tool-enablable software applications;

the hardware processor to execute computer-readable program code instructions of an AI productivity tool-enablable software application multi-vector value comparator to compare the capability intent values for a first AI productivity tool-enablable software application capability of a first AI productivity tool-enablable software application to a second AI productivity tool-enablable software application capability of a second AI productivity tool-enablable software application from the gathered capabilities by comparing the capability intent values of the first AI productivity tool-enablable software application capability to the second AI productivity tool-enablable software application capability using a similarity threshold vector value;

the hardware processor to select the first AI productivity tool-enablable software application capability to be part of primary AI productivity tool-enablable software application capabilities and the second AI productivity tool-enablable software application capability as part of redundant AI productivity tool-enablable software application capabilities when the capability intent values of the first AI productivity tool-enablable software application capability and the second AI productivity tool-enablable software application capability fall within the similarity vector value threshold; and the hardware processor executing computer readable code instructions of the AI productivity tool software system to respond to the user input queries from the primary AI productivity tool-enablable software application capabilities.

10. The information handling system of claim 9 further comprising:

the hardware processor to execute the computer-readable program code instructions of the AI productivity tool to prioritize using a selected primary AI productivity tool-enablable software application that includes the first AI productivity tool-enablable software application capability to interface with the execution of the AI productivity tool to execute an operation, service, or response using the first AI productivity tool-enablable application over the second AI productivity tool-enablable application in response to a first user input query having a query intent value that correlates with the first AI productivity tool-enablable software application capability and the second AI productivity tool-enablable software application capability as responsive to the first user input query.

11. The information handling system of claim 9 further comprising:

the hardware processor to execute computer-readable program code instructions of an AI productivity tool-enablable software application capability replacement module to determine when any AI productivity tool-enablable software application having primary AI productivity tool-enablable software application capabilities is uninstalled or updated and replace any missing primary AI productivity tool-enablable software application capabilities with one of the redundant AI productivity tool-enablable software application capabilities.

12. The information handling system of claim 9 further comprising:

the hardware processor to execute computer-readable program code instructions of an AI productivity tool-enablable software application capability replacement module to determine when a first AI productivity tool-enablable software application is uninstalled or updated to remove the first AI productivity tool-enablable software application capability and replace the first AI productivity tool-enablable software application capability in the primary AI productivity tool-enablable software application capabilities with the second AI productivity tool-enablable software application capability from the redundant AI productivity tool-enablable software application capabilities.

13. The information handling system of claim 9, wherein the first AI productivity tool-enablable software application capability is selected to be part of the primary AI productivity tool-enablable software application capabilities over the second AI productivity tool-enablable software application capability based on a determination that the capability intent value of the first AI productivity tool-enablable software application capability is more distinct from other capability intent values associated with the gathered capabilities in a multi-axis vector space than the second AI productivity tool-enablable software application capability.

14. The information handling system of claim 9, wherein the first AI productivity tool-enablable software application capability is selected to be part of the primary AI productivity tool-enablable software application capabilities over the second AI productivity tool-enablable software application capability based on a determination that the first AI productivity tool-enablable software application capability is designated as a higher priority than the second AI productivity tool-enablable software application.

15. The information handling system of claim 9 further comprising:

a memory device for storing data describing the capability intent values for each of the redundant AI productivity tool-enablable software application capabilities in a redundant AI productivity tool-enablable software application capabilities database.

16. The information handling system of claim 9 further comprising:

a memory device for storing data describing the capability intent values for each of the primary AI productivity tool-enablable software application capabilities in a primary AI productivity tool-enablable software application capabilities database.

17. The information handling system of claim 16, wherein the first AI productivity tool-enablable software application capability is selected to be part of the primary AI productivity tool-enablable software application capabilities over the second AI productivity tool-enablable software application capability based on a determination that the capability intent value of the first AI productivity tool-enablable software application capability is more distinct from other capability intent values associated with the gathered capabilities in a multi-axis vector space than the second AI productivity tool-enablable software application capability.

18. An information handling system comprising:

a hardware processor to execute computer-readable program code instructions of an AI productivity tool-enablable software application capabilities gathering module to gather capabilities associated with each of a plurality of AI productivity tool-enablable software applications operating on the information handling system for use with an AI productivity tool software system for accepting user input queries via text or voice inputs;

the hardware processor to execute computer-readable program code instructions of an AI productivity tool-enablable software application natural language generator to generate capability intent values for association with natural language descriptors for the gathered capabilities associated with each of the plurality of AI productivity tool-enablable software applications;

the hardware processor to execute computer-readable program code instructions of an AI productivity tool-enablable software application multi-vector value comparator to compare the capability intent values for a first AI productivity tool-enablable software application capability of a first AI productivity tool-enablable software application to a second AI productivity tool-enablable software application capability of a second AI productivity tool-enablable software application from the gathered capabilities by comparing the capability intent values of the first AI productivity tool-enablable software application capability to the second AI productivity tool-enablable software application capability using a similarity threshold vector value;

the hardware processor to select the first AI productivity tool-enablable software application capability to be part of primary AI productivity tool-enablable software application capabilities and the second AI productivity tool-enablable software application capability as part of redundant AI productivity tool-enablable software application capabilities when the capability intent values of the first AI productivity tool-enablable software application capability and the second AI productivity tool-enablable software application capability fall within the similarity vector value threshold;

the hardware processor to designate gathered capabilities with capability intent values not having any other capability intent values within the similarity vector value threshold as part of the primary AI productivity tool-enablable software application capabilities; and the hardware processor executing computer readable code instructions of the AI productivity tool software system to respond to the user input queries from the primary AI productivity tool-enablable software application capabilities.

19. The information handling system of claim 18 further comprising:

the hardware processor to execute computer-readable program code instructions of an AI productivity tool-enablable software application capability replacement module to determine when a first AI productivity tool-enablable software application is uninstalled or updated to remove the first AI productivity tool-enablable software application capability and replace the first AI productivity tool-enablable software application capability in the primary AI productivity tool-enablable software application capabilities with the second AI productivity tool-enablable software application capability from the redundant AI productivity tool-enablable software application capabilities.

20. The information handling system of claim 18 further comprising:

the hardware processor to execute the computer-readable program code instructions of the AI productivity tool to prioritize using a selected primary AI productivity tool-enablable software application that includes the first AI productivity tool-enablable software application capability to interface with the execution of the AI productivity tool to execute an operation, service, or response using the first AI productivity tool-enablable application over the second AI productivity tool-enablable application in response to a first user input query having a query intent value that correlates with the first AI productivity tool-enablable software application capability and the second AI productivity tool-enablable software application capability as responsive to the first user input query.

* * * * *